(12) United States Patent
Kato

(10) Patent No.: US 6,342,663 B1
(45) Date of Patent: Jan. 29, 2002

(54) MUSICAL PERFORMANCE TRAINING APPARATUS AND RECORD MEDIUM WITH MUSICAL PERFORMANCE TRAINING PROGRAM

(75) Inventor: Hitoshi Kato, Fussa (JP)

(73) Assignee: Casio Computer Co., Ltd., Tokyo (JP)

( * ) Notice: Subject to any disclaimer, the term of this patent is extended or adjusted under 35 U.S.C. 154(b) by 0 days.

(21) Appl. No.: 09/695,664

(22) Filed: Oct. 24, 2000

(30) Foreign Application Priority Data

Oct. 27, 1999 (JP) .......................................... 11-304947
Oct. 27, 1999 (JP) .......................................... 11-305028

(51) Int. Cl.$^7$ ............................................. G09B 15/00
(52) U.S. Cl. ...................... 84/470 R; 84/464 A; 84/478
(58) Field of Search .......................... 84/470 R, 477 R, 84/478, 464 A

(56) References Cited

U.S. PATENT DOCUMENTS

| | | | |
|---|---|---|---|
| 5,394,784 A | * 3/1995 | Pierce et al. | 84/464 A |
| 5,656,789 A | * 8/1997 | Nakada et al. | 84/477 R |
| 5,907,115 A | * 5/1999 | Matsunaga et al. | 84/464 A |
| 6,008,783 A | * 12/1999 | Kitagawa et al. | 84/464 A |
| 6,025,550 A | 2/2000 | Kato | 84/464 A |
| 6,078,004 A | * 6/2000 | Eitaki | 84/477 R |
| 6,180,865 B1 | * 1/2001 | Ishiguro | 84/477 R |

* cited by examiner

*Primary Examiner*—Jeffrey Donels
(74) *Attorney, Agent, or Firm*—Frishauf, Holtz, Goodman, Langer & Chick, P.C.

(57) ABSTRACT

A musical performance training apparatus communicates with a musical instrument having light emitting elements for respective operation elements (e.g., musical keys). The apparatus sequentially reads, in advance, respective note data of a musical performance training part before their respective play timings (note-on timings), sequentially reads respective note data of automatic performance parts at their respective play timings and sends them to the instrument so that the light emitting elements are so controlled by the note data of the training part as to notify a trainee of key(s) to be played next, allowing the trainee to operate keys or play the training part in time agreement with the automatic performance. When reading note data of chord notes with a time difference or error from one another, the apparatus corrects the chord notes so as to have the same play time and sends the corrected results to the instrument. The apparatus selects or changes a musical part to be used for musical performance training and assigns note data of the selected musical part to a communication channel (e.g., MIDI channel) which is fixedly used by the instrument navigator to control the light emitting elements.

11 Claims, 40 Drawing Sheets

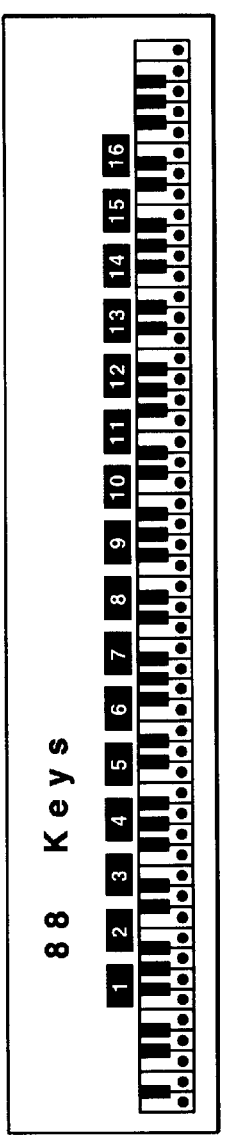
FIG.21A RANGE : 88
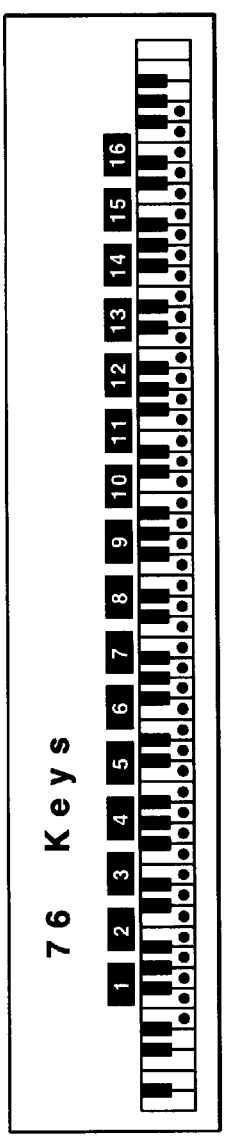
FIG.21B RANGE : 76
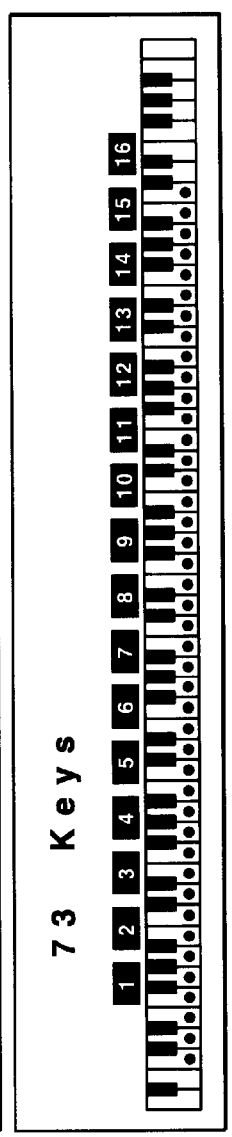
FIG.21C RANGE : 73
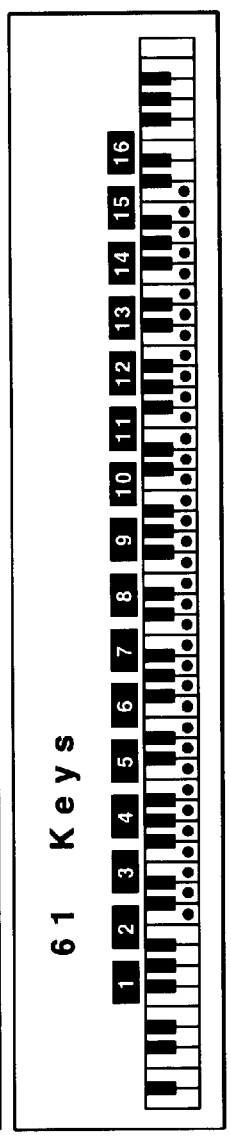
FIG.21D RANGE : 61
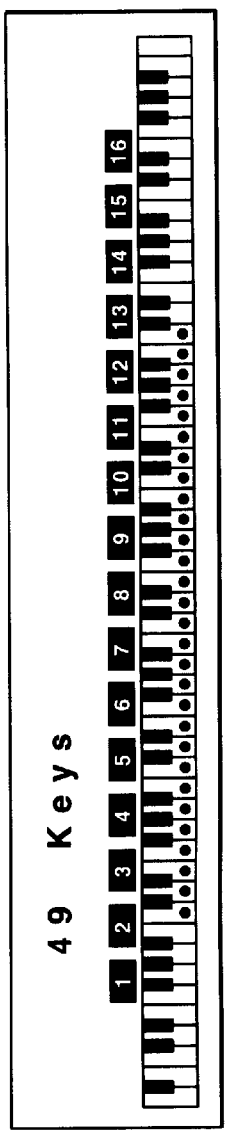
FIG.21E RANGE : 49

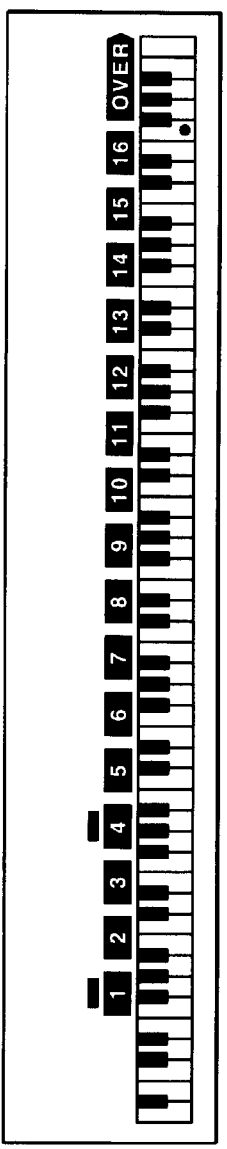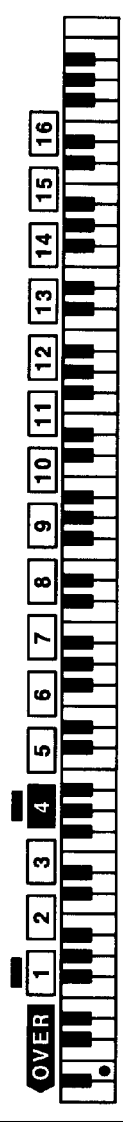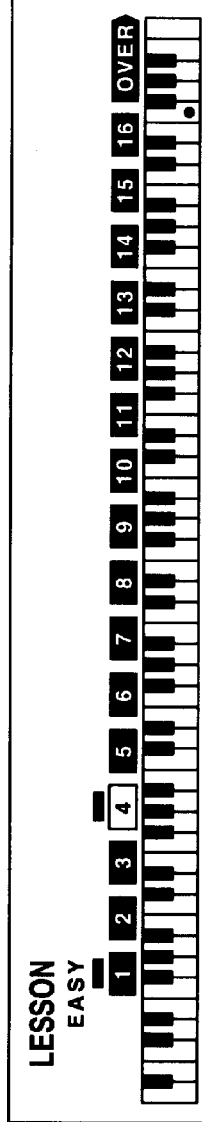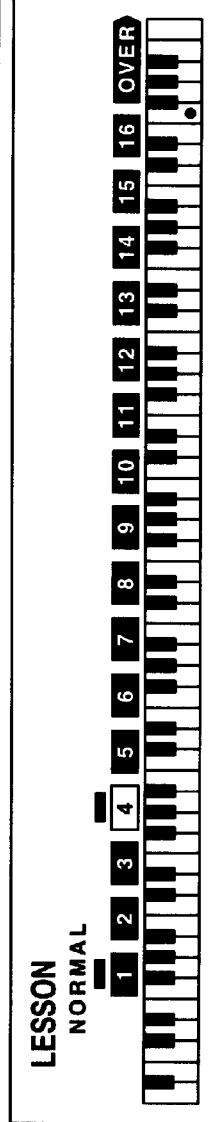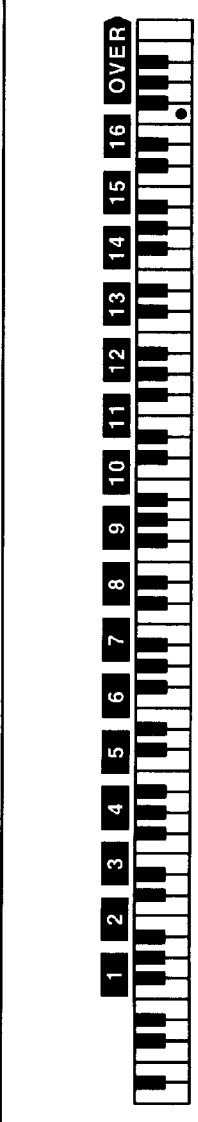
FIG. 23A NORMAL PLAY
FIG. 23B GUIDE PART PLAY
FIG. 23C LESSON EASY
FIG. 23D LESSON NORMAL
FIG. 23E STOP

MUSICAL PERFORMANCE TRAINING APPARATUS AND RECORD MEDIUM WITH MUSICAL PERFORMANCE TRAINING PROGRAM

TECHNICAL FIELD

The present invention relates to a musical performance training apparatus which communicates with musical instruments and sends them music data for musical performance training, and to a recording medium having a musical performance training program stored thereon.

BACKGROUND OF THE INVENTION

Musical instruments are known which have a musical navigation function (called navigator) for guiding a user (player) to play musical notes for performance training. An electronic keyboard instrument with such a navigator, for instance, employs a plurality of light emitting elements (e.g., LEDs) disposed in respective keys of a musical keyboard. The navigator controls the light emitting elements to turn on or off according to music data of a musical part to be played by a user (player) for performance training, thus notifying the player of a key or keys to be operated. Music data used by the navigator may be supplied by an interval storage, such as ROM, for storing the music data. MIDI-controlled musical instruments can receive MIDI-formatted music data from an external apparatus or storage and use them for musical navigation.

The use of an external source of music data by MIDI or any other suitable communication provides a wide variety of music to the navigator. Source music data may include chord notes. In general, chord notes are played at the same time. Unfortunately, chord notes included in the source music data can have a time difference from one another. In this case, the prior art music navigator turns on respective chord note key light emitting elements with a corresponding time difference since the navigator operates according to the source or supplied music data. As a result, a user or player finds it very hard to play the chord notes at the same time.

The prior art music performance apparatus uses music data including a plurality of musical parts (melody, chord, base, rhythm part etc.) as follows. For a musical part (e.g., melody) to be played by a user for performance training, the navigator controls key light emitting elements to turn on at their respective play (note-on) timings. For other musical parts, the navigator plays as background music players i.e., automatically performs the other musical parts by generating notes at their respective play (note-on) timings. As a result, automatic performance of the other musical parts proceeds in synchronism with the light navigation of the musical part for performance training.

This arrangement, however, introduces a delayed key-operation response of the user since the user may first recognize a key which is lit up and then operate it with a delay relative to automatic performance.

To overcome the delayed response problem, a music performance training apparatus is proposed which uses an internal music buffer storage for storing music data covering a complete music piece and reads from the storage musical parts for automatic performance with a predetermined time delay relative to reading of the musical part for performance training.

The proposed apparatus has the disadvantages that it requires storage capacity of storing the whole music piece data and complicated processing.

MIDI-formatted music data includes musical part information (in the form of MIDI channel number) for respective note data (not on/off event data). Thus, the prior art music performance training apparatus using such music data transmits note data with a corresponding MIDI output channel to a MIDI-controlled musical instrument with a navigator. A typical MIDI-controlled musical instrument with the navigator uses note data with a specific and fixed input channel for musical navigation by controlling key light emitting elements according to such note data. As a result, a user cannot easily select or change a musical part for musical navigation i.e., the one to be practiced by the user for performance training.

DISCLOSURE OF THE INVENTION

It is, therefore, an object of the invention to provide an apparatus for musical performance training capable of guiding a user to play chord notes at the same time even if source or read chord note data include chord notes with a time difference from one another.

In accordance with an aspect of the invention, there is provided an apparatus for musical performance training, comprising:

reading means for sequentially reading a succession of note data;

transmitting means for transmitting performance training data to a musical instrument connected to the apparatus based on the read note data;

detecting means for detecting a time difference between a note-on time of first note data read by said reading means and a note-on time of subsequent note data read by said reading means; and controlling means for determining chord notes to be played simultaneously from the first and subsequent note data when the detected time difference is smaller than a predetermined value and for controlling said transmitting means to simultaneously transmit a plurality of the performance training data based on the first and subsequent note data in response to said determining.

With this arrangement, a user an easily play chord notes at the same time even if the source music data include chord notes with a time difference from one another.

Another object of the invention is to provide an apparatus for musical performance training capable of guiding a user to play a musical part for performance training in time-agreement with automatic performance of other musical parts, without requiring additional storage capacity or complicated processing.

In accordance with another aspect of the invention, there is provided an apparatus for musical performance training, comprising:

reading means for sequentially reading a succession of note data including a plurality of musical parts;

transmitting means for transmitting said read note data of a musical part for performance training to a musical instrument connected to the apparatus and for transmitting said read note data of a musical part for automatic performance to the musical instrument; and controlling means for controlling said reading means to read, in advance, respective note data of the musical part for performance training before their respective note-on timings and for controlling said reading means to read respective note data of the musical part for automatic performance at their respective note-on timings.

With this arrangement, a user can easily play a musical performance training part in time-agreement with the automatic performance of other musical parts. The arrangement does not need additional storage capacity or complicated processing.

A further object of the invention is to provide an apparatus for musical performance training capable of selecting or changing a musical part for musical performance training.

In accordance with a further aspect of the invention, there is provided an apparatus for musical performance training, comprising:

reading means for sequentially reading music data including a plurality of musical parts;

transmitting means having a plurality of output channels for transmitting the read music data to a musical instrument having a plurality of input channels corresponding to the plurality of the output channels in such a manner that each output channel carries a different one of the plurality of musical parts of the music data;

selecting means for selecting one of the plurality of musical parts of the music data, as musical part for performance training; and assigning means for assigning the selected musical part to one of the output channels corresponding to one of the input channels preselected for performance training.

With this arrangement, a user can easily choose a desired one of a plurality of musical parts as the one for performance training.

The invention can also be applied to a recording medium storing a computer-readable, musical performance training program.

BRIEF DESCRIPTION OF THE DRAWINGS

FIGS. 21A–E are views of a keyboard range setting screen displayed on LCD;

FIGS. 23A–E are views of a displayed screen indicative of a keyboard range-over on LCD for a plurality of modes of operation;

BEST MODE OF CARRYING OUT THE INVENTION

Musical performance training apparatus of an embodiment of the invention will be described in more detail with reference to the accompanying drawings. The present musical performance training apparatus uses music data including a plurality of music parts and selects one of them (e.g., melody part) for musical performance training by a player (user). Specifically, the player practices the selected part with the remaining musical parts automatically performed as so-called minus one automatic performance. Lesson modes of the musical performance training apparatus include a normal lesson mode in which the automatic performance proceeds at a predetermined tempo without waiting for player's performance, easy (1) lesson mode in which the automatic performance restarts when the player operates a musical key and easy (2) lesson mode in which the automatic performance waits for correct key operation by the player. A desired one of the lesson modes can be selected. The musical training apparatus can also provide a solo automatic performance mode in which the selected part is automatically played in solo as good example of performance.

Figure 1:
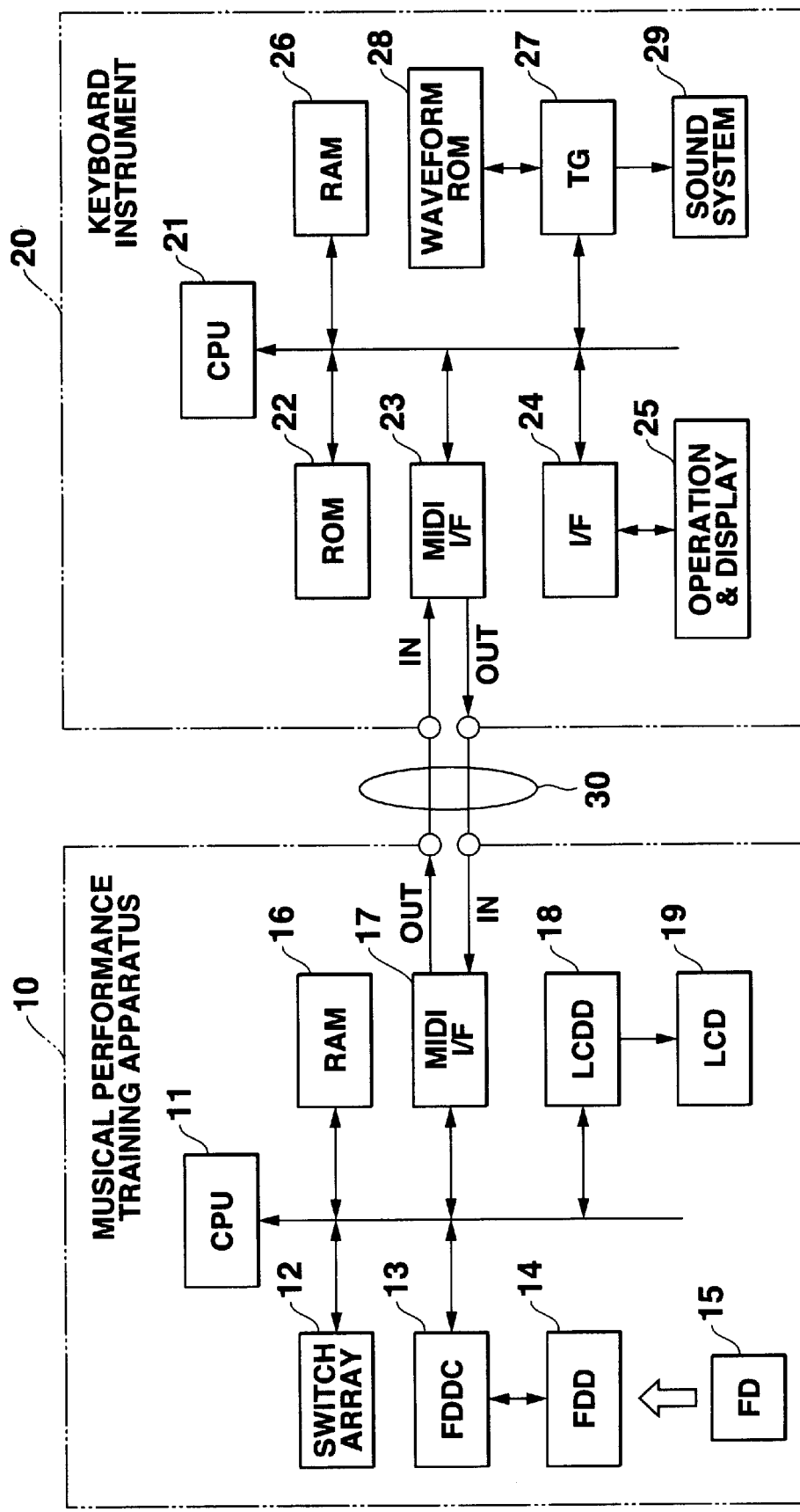
FIG. 1 is a block diagram showing a system employing a musical performance apparatus in accordance with the invention.

FIG. 1 shows a system employing a musical performance training apparatus in accordance with the invention. The musical performance training apparatus 10 is connected to an electronic keyboard instrument 20 via a MIDI cable 30. CPU 11 in the musical performance training apparatus 10 sends control signals to respective components of the apparatus 10 interconnected via a system bus and communicates data therewith to control the entirety of the apparatus. CPU 11 includes a ROM for storing a musical performance training program to be run by CPU11.

The switch array 12 enters switch input data of on/off condition of respective switches in response to a scan control signal. FDDC (floppy disk drive controller) 13 controls FDD (floppy disk driver) 14 in response to a drive control signal to read music data from FD (floppy disk) 15 inserted in FDD 14. RAM 16 stores data, such as switch input data from switch array 12, music data from FDDC 13, MIDI data from the keyboard instrument 20 and MIDI output data to the keyboard instrument 20. Contents stored in RAM 16 will be described in more detail later.

MIDI interface 17 sends MIDI data from RAM 16 to the keyboard instrument 20 in response to a MIDI output control signal and receives MIDI data from the keyboard instrument 20 in response to a MIDI input control signal. The received MIDI data is written into RAM 16. LCDC (liquid crystal display controller) 18 supplies display data from CPU 11 and a display control signal to LCD (liquid crystal display) 18.

In the keyboard instrument 20, CPU 21 supplies control signals to respective components of the instruments interconnected via a system bus and communicates therewith to control the entirety of the instrument 20. ROM 22 stores control programs to be run by CPU 21. MIDI interface 23 sends MIDI data to the musical performance training apparatus 10 in response to a MIDI output control signal and receives MIDI data from the musical performance training apparatus 10 in response to a MIDI input control signal. Interface 24 enables the operation and display 25 including a musical keyboard, switches and display to communicate data, such as key operation data, switch input data and display data with CPU 21. Each key of the musical keyboard is provided with a light emitting element, such as LED which is controlled to light up or brink according to MIDI data supplied from the musical performance training apparatus 10.

Figure 2:
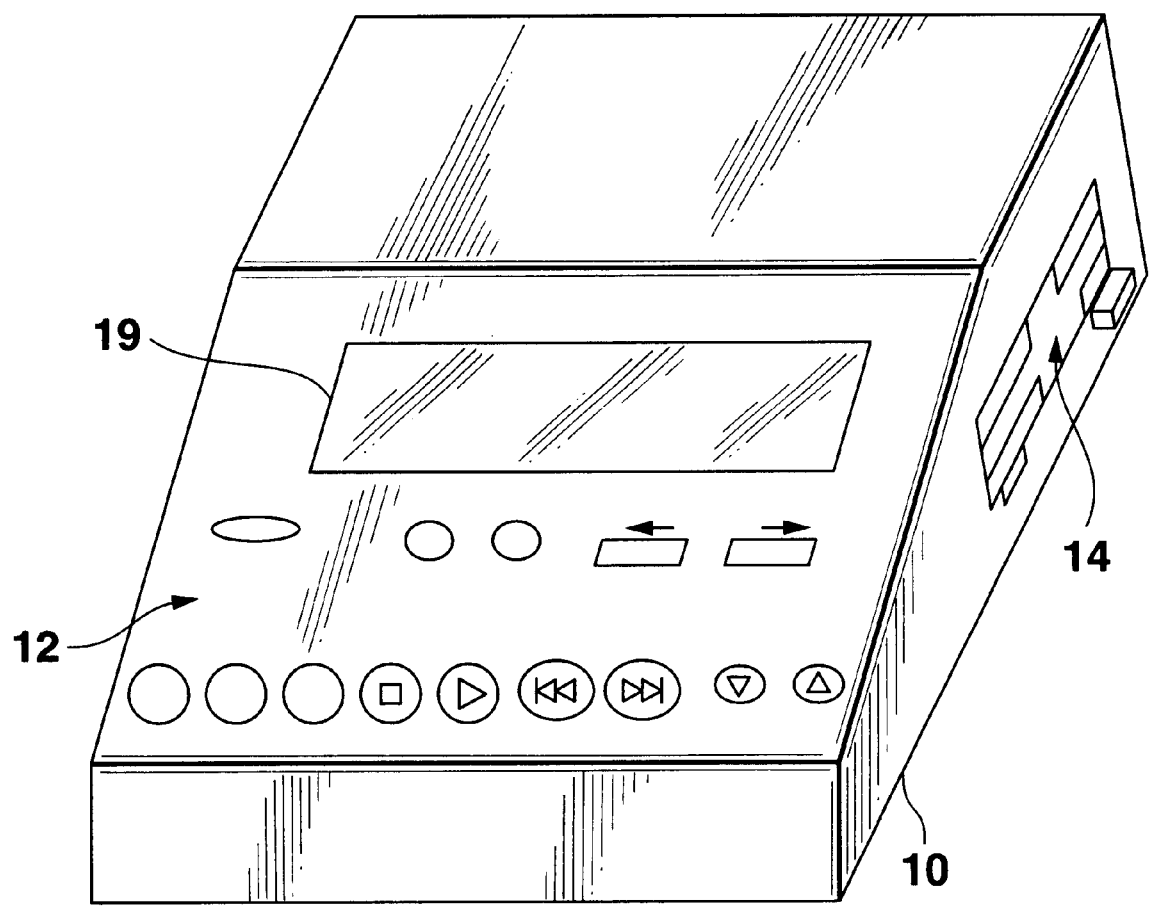
FIG. 2 is an external view of the musical performance training apparatus in FIG. 1.
Figure 3:
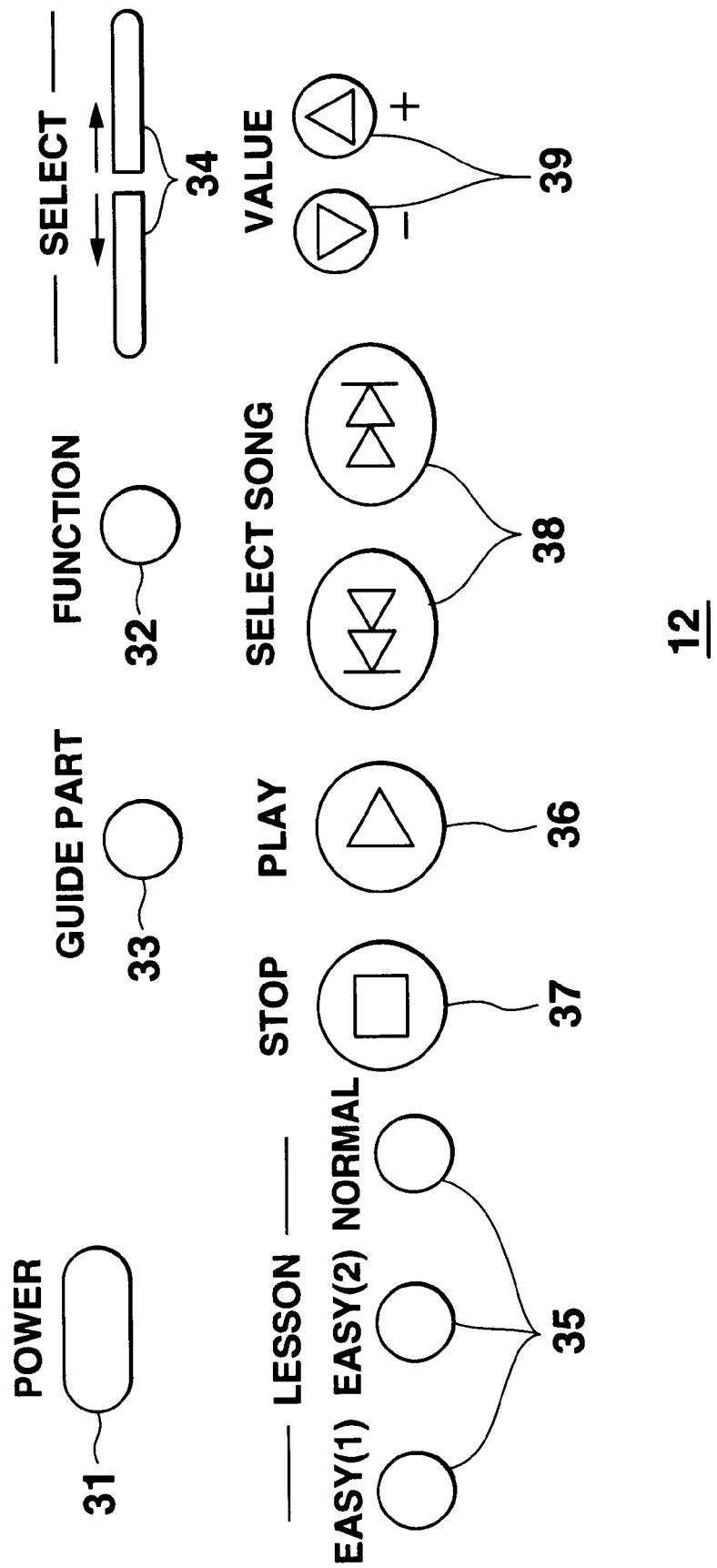
FIG. 3 shows the switch array in FIG. 2 in more detail.

RAM 26 stores data, such as MIDI data communicated via MIDI interface 23, key operation data, switch input data and display data communicated via the interface 24. Tone generator 27 reads waveform data from waveform ROM 28 in response to a tone control signal from CPU 21 to generate a tone signal which is supplied to sound system 29 to reproduce sound. FIG. 2 is an external view of the musical performance training apparatus 10. A switch array 12 including a plurality of switches and LCD 19 are disposed on a front operation panel. A FD insertion slot of FDD 14 is disposed on a side of the apparatus 10. FIG. 3 shows the switch array 12 in more detail. Power switch 31 powers on/off the apparatus. When the power is on, the control program of CPU 11 starts. The function switch 32 serves as a mode switch which selects a play setting mode or function setting mode. Guide part 33 selects a guide part auto play mode in which a single guide part is automatically played in solo or a normal (not solo) performance mode. Select switch 34 includes a select-left switch with a ←mark and a select-right switch with a →mark. The select switch 34 has different selection functions depending on modes of the operation.

Lesson switch 35 include an easy (1) switch, an easy (2) switch and normal switch to select a performance lesson step. Play switch 36 starts musical performance, such as solo or normal one. Stop switch 37 stops musical performance (sole, normal or lesson one). Select song switch 38 selects a song or music piece to be performed. Value switch 39 enters data to be set, such as keyboard range, navigation channel and guide part depending on modes of the operation. The function of the switches will be described in more detail later.

Figure 4:
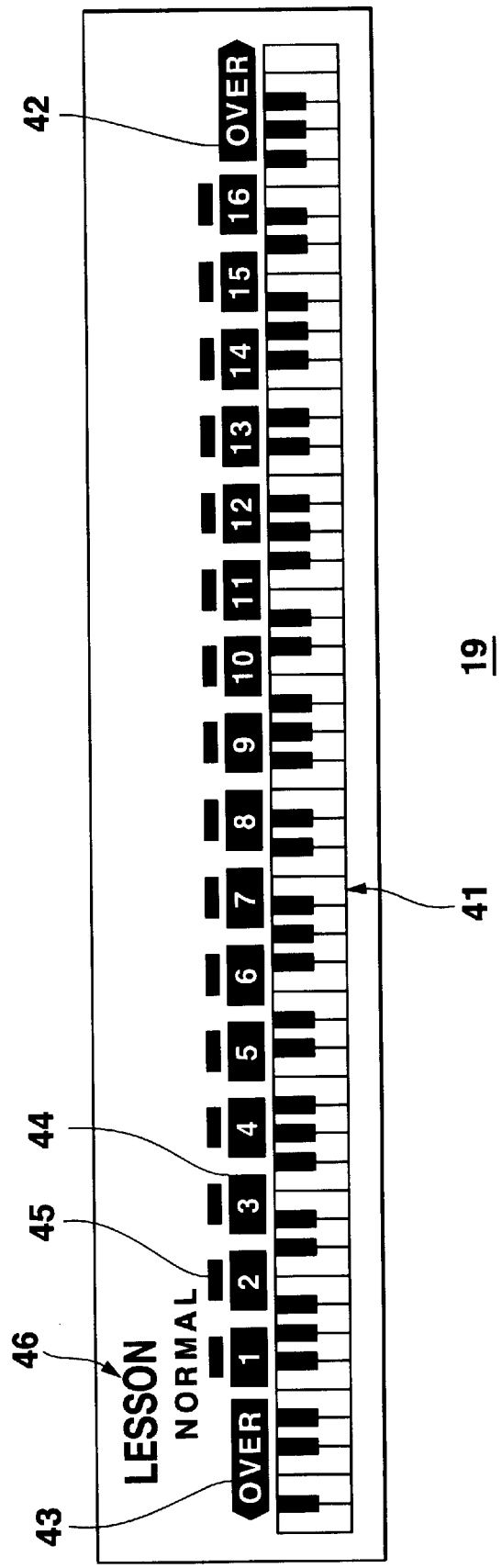
FIG. 4 shows contents displayed on LCD in FIG. 2.
Figure 5:
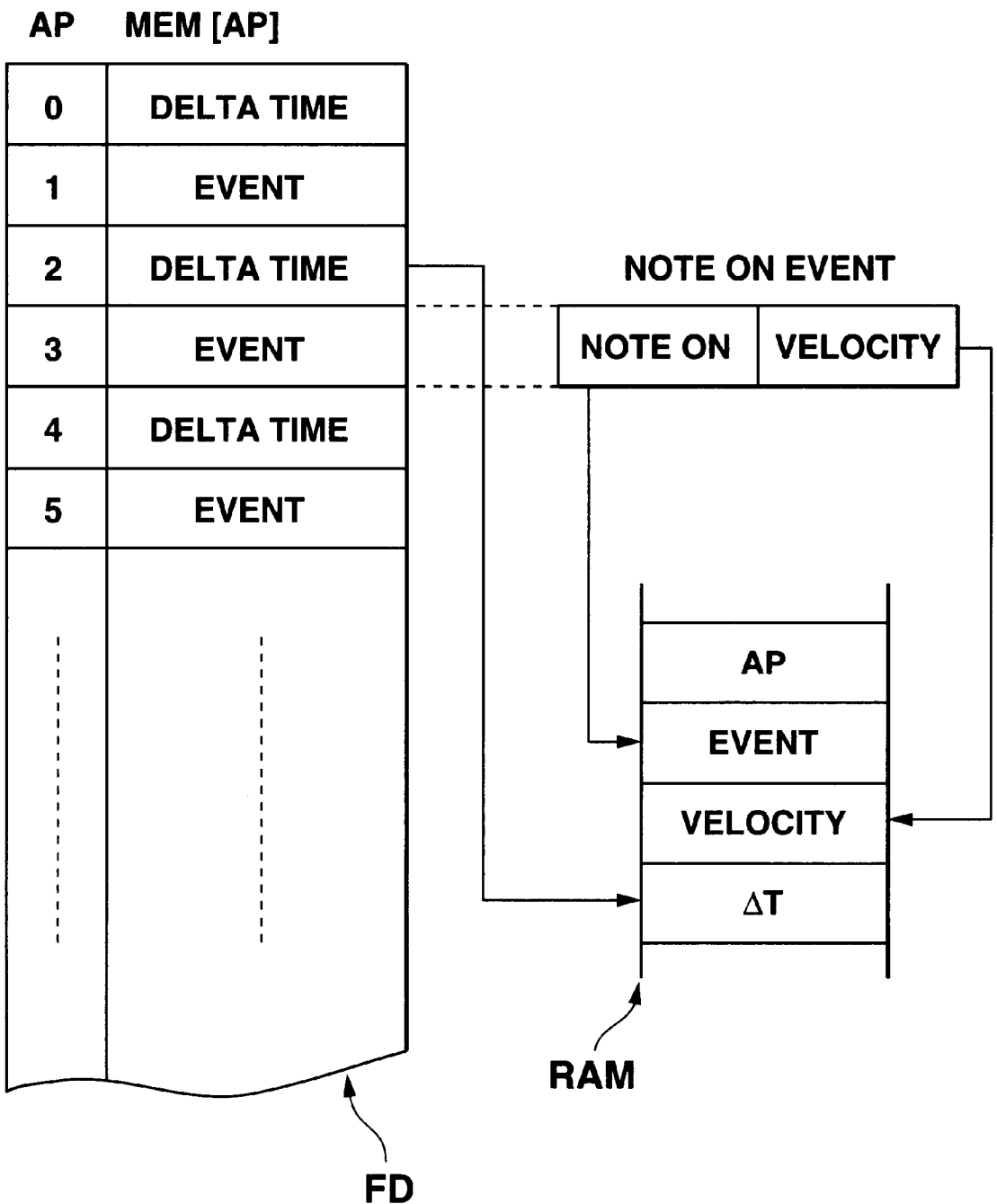
FIG. 5 shows a structure of music data stored in FD in FIG. 1.

FIG. 4 shows displayed contents of LCD 19. Area 41 indicates a musical keyboard having keys up to 88 ones.

Area 42 is a too-high or right-over segment which blinks when a note to be played is beyond the highest key of the keyboard instrument 20. Area 43 is a too-low or left-over segment which blinks when a note to be played is beyond the lowest key of the keyboard instrument 20. An 1–16 numbered area 44 is provided between the left-over segment 43 and right-over segment 42. The numbered area 44 indicates a condition of 16 MIDI channels. The channel numbered area 44 indicates whether a channel is automatically performed or manually performed. Area 45 of bars indicates whether a channel is note-generating. Area 46 indicates a current condition of performance, for example, normal lesson mode. Other area is irrelevant to the invention so that no further description is required.

Figure 15:
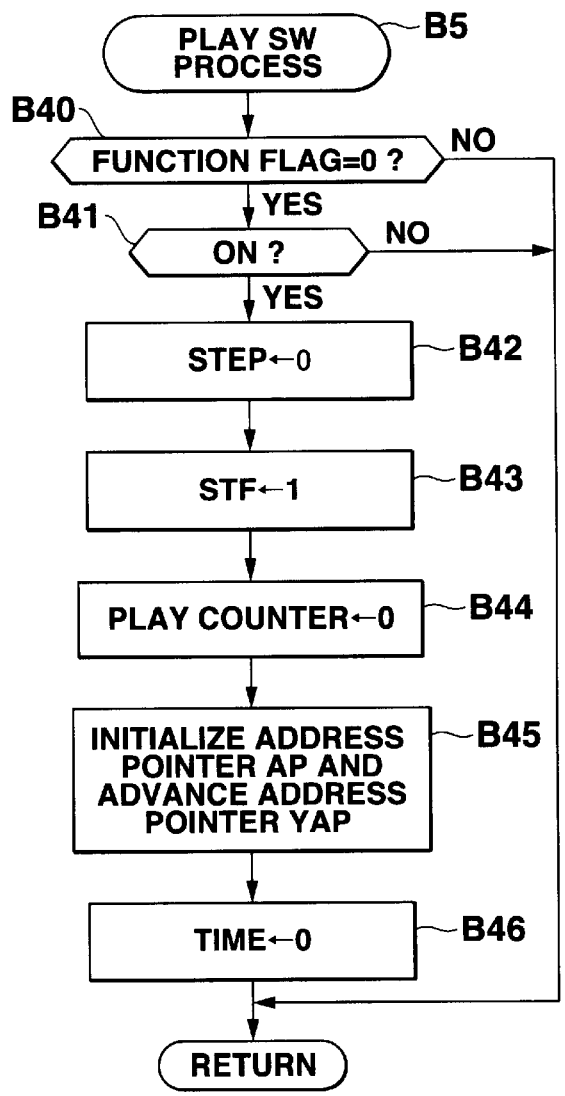
FIG. 15 is a flow chart of a play switch process.

FIG. 15 shows a structure of music data stored in FD (floppy disk) 15 and music data buffer in RAM 16. Music data in FD 15 includes a succession of event data and delta time data indicative of a time to the next event. Address pointer AP points to individual data. Each event data indicates one of a plurality of event, such as note-on event, note-off event, program change for changing a tone timber and control change for controlling sound-effects. Each event data contains musical part information corresponding to one of 16 MIDI channels so that the music data stored in FD represents, as a whole, music or succession of notes including a plurality of musical parts. The music data buffer in RAM 16 includes EVENT register for storing a note number or pitch of a note event, VELOCITY register for storing velocity of the event. Δt register for storing delta time data and address pointer AP for pointing to an address of event or delta time data in FD-stored music data.

Figure 6:
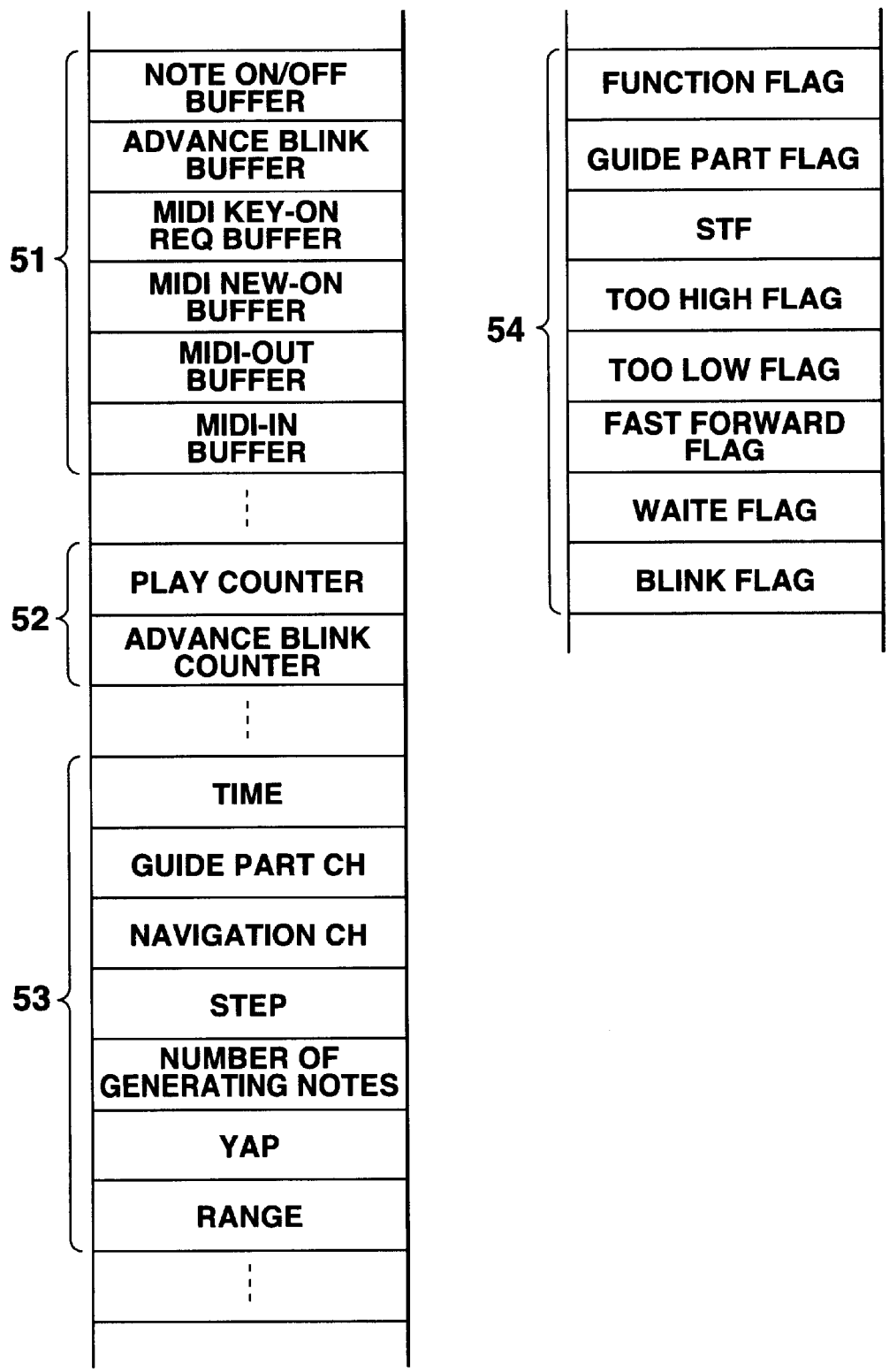
FIG. 6 shows contents of RAM in FIG. 1.

FIG. 6 shows other contents of RAM 16. Buffer area 51 includes a note on/off buffer, advance blink buffer, MIDI key-on request buffer, MIDI new-on buffer, MIDI-out buffer and MIDI-in buffer. The note on/off buffer stores note data of notes to be generated or released. The advanced blink buffer stores advance blink data which is used to blink a light emitting element of a musical key of the keyboard instrument 20 to be played or operated next. MIDI key-on request buffer stores key-on request data indicative of a key number or note number corresponding to advance blink data sent to the keyboard instrument 20. MIDI new-on buffer stores key or note number data received from keyboard instrument 20, indicative of newly operated (key-on) key in response to the key-on request. The MIDI-out-buffer stores MIDI data to be transmitted to the keyboard instrument 20. The MIDI-in buffer stores MIDI data received from the keyboard instrument 20.

Counter area 52 includes a play counter and an advance blink counter. The play counter is a time counter used to control time of automatic performance. The advance blink counter is a time counter of an advance notice of a key to be played by a player (user) by blinking a light emitting element of the key in the keyboard instrument 20.

Register area 53 includes TIME, guide part channel, navigation channel, STEP, number of generating notes, YAP and RANGE registers. The TIME register is a time counter. The guide part channel register stores the channel number of the guide part to be automatically played in solo or played by a user for musical performance training. The navigation channel register stores the channel number of a music part of performance training i.e., the one to be played by the player (user) for performance practice. The STEP register indicates a performance mode. It has the value of "1" for an easy (1) lesson mode in which automatic performance waits for any key operation of the player. It has the value of "2" for an easy (2) lesson mode in which automatic performance proceeds when a proper key is operated by the player. It has the value of "3" for a normal lesson mode in which automatic performance proceeds without waiting for player's key operation. It has the value of "0" for an normal automatic performance mode. The YAP register or pointer points to an address of next event note to be played by a player. The RANGE register stores the keyboard range of the keyboard instrument 20.

The flag area 54 includes a function flag, guide part flag, start flag STF, too-high flag, too-low flag, fast forward flag, wait flag and blink flag. The function flag indicates the play setting mode with "0" and indicates the function setting mode with "1". The guide part flag indicates the solo automatic performance mode with "1". The start flag STF indicates stop of automatic performance with "0", and run of automatic performance with "1. The too-high flag has the value of "1" when a note to be played by the player (user) is higher than the highest key of the musical keyboard. The too-low flag has value of "1" when a note to be played by a player is lower than the lowest key of the musical keyboard. The fast forward flag indicate a fast forward condition "1". The wait flag has a value of "1" when the automatic performance wait for key operation by the player. The blink flag alternately changes the value at predetermined blinking periods or intervals to control blinking of a corresponding light emitting element in the keyboard instrument 20.

The operation of the present musical training apparatus 10 is now described with reference to flow charts of CPU 11 and figures showing displayed screens on LCD 19.

Figure 7:
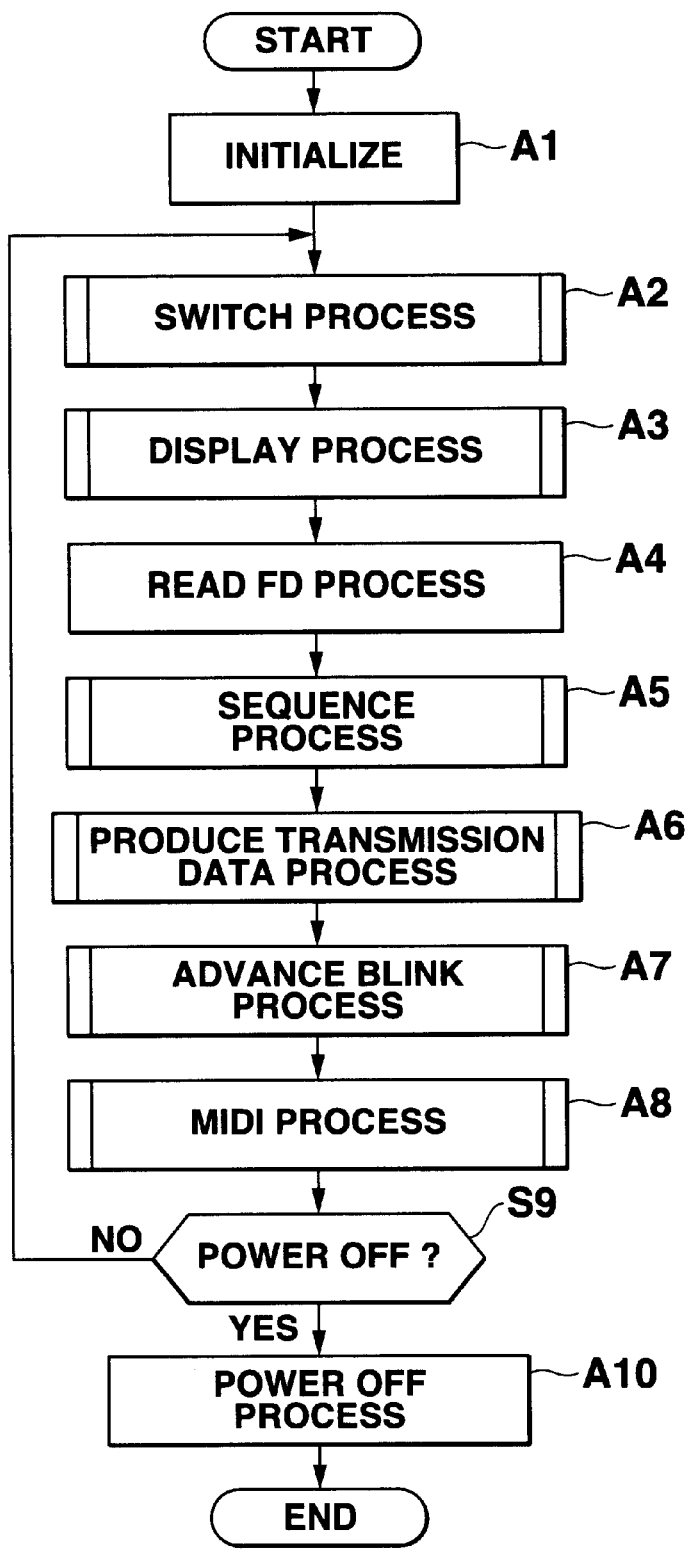
FIG. 7 is a flow chart of a main routine of CPU in the musical performance training apparatus in FIG. 1.
Figure 8A:
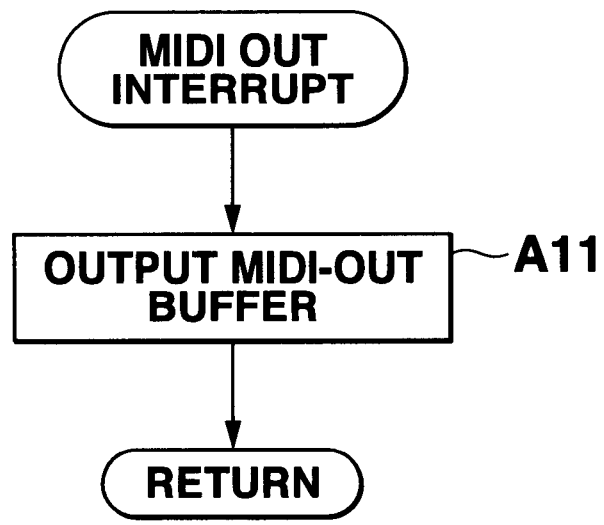
FIGS. 8A and 8B are flow charts of MIDI interrupt services of CPU.
Figure 8B:
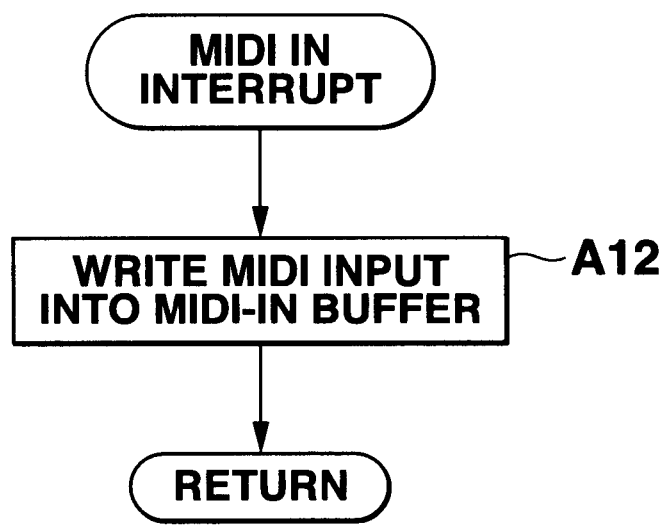

FIG. 7 is a main routine of CPU 11. After initializing system (A1), the CPU11 executes the loop of switch process A2, display process A3, read FD process A4, sequence process A5, produce transmission data process A6, advance blink process A7, MIDI process A8 and power off check A9. The loop repeats until the power is off. When the power is off, a power off process A10 is executed. In response to MIDI output interrupt request, CPU 11 executes a MIDI-out interrupt service shown in FIG. 8A by outputting the MIDI-out buffer data (A11) to the keyboard instrument 20. In response to a MIDI-in interrupt request signal, CPU 11 executes a MIDI-in interrupt service by writing MIDI input data from the keyboard instrument 20 into the MIDI-in buffer (A12).

Figure 9:
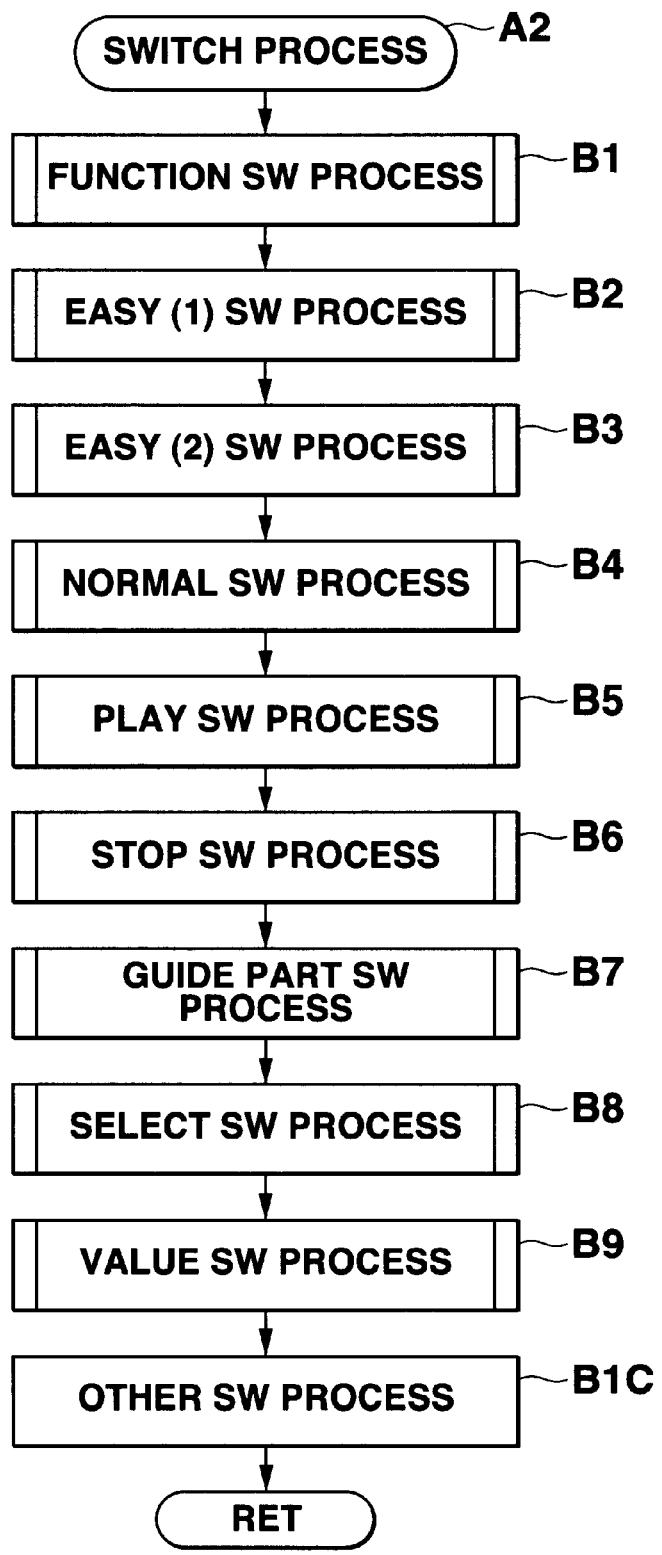
FIG. 9 is a flow chart of a switch process.

FIG. 9 is a flow chart of the switch process A2 in the main routine of FIG. 7. The switch process A2 executes function switch process B1, easy (1) switch process B2, easy (2) process B3, normal switch process B4, play switch process B5, stop switch process B6, guide part switch process B7, select switch process B8, value switch process B9, and other switch process B10.

Figure 10:
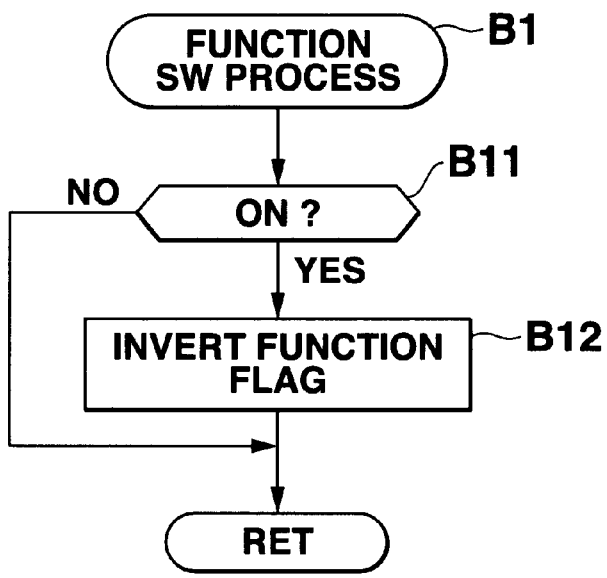
FIG. 10 is a flow chart of a function switch process.

FIG. 10 is a flow chart of the function switch process B1 in FIG. 9. When the function switch is turned on (B11), the block B12 changes the function flag.

Figure 11:
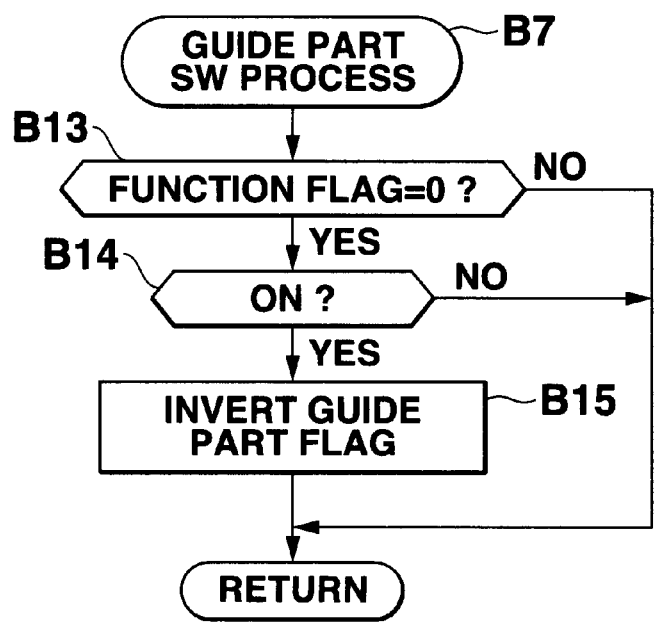
FIG. 11 is a flow chart of a guide part switch process.

FIG. 11 is a flow chart of the guide part switch process B7 in FIG. 9. If the function flag is "0" indicative of play setting mode, and when the guide part switch is tuned on (B14), the block B15 inverts the guide part flag.

Figure 12:
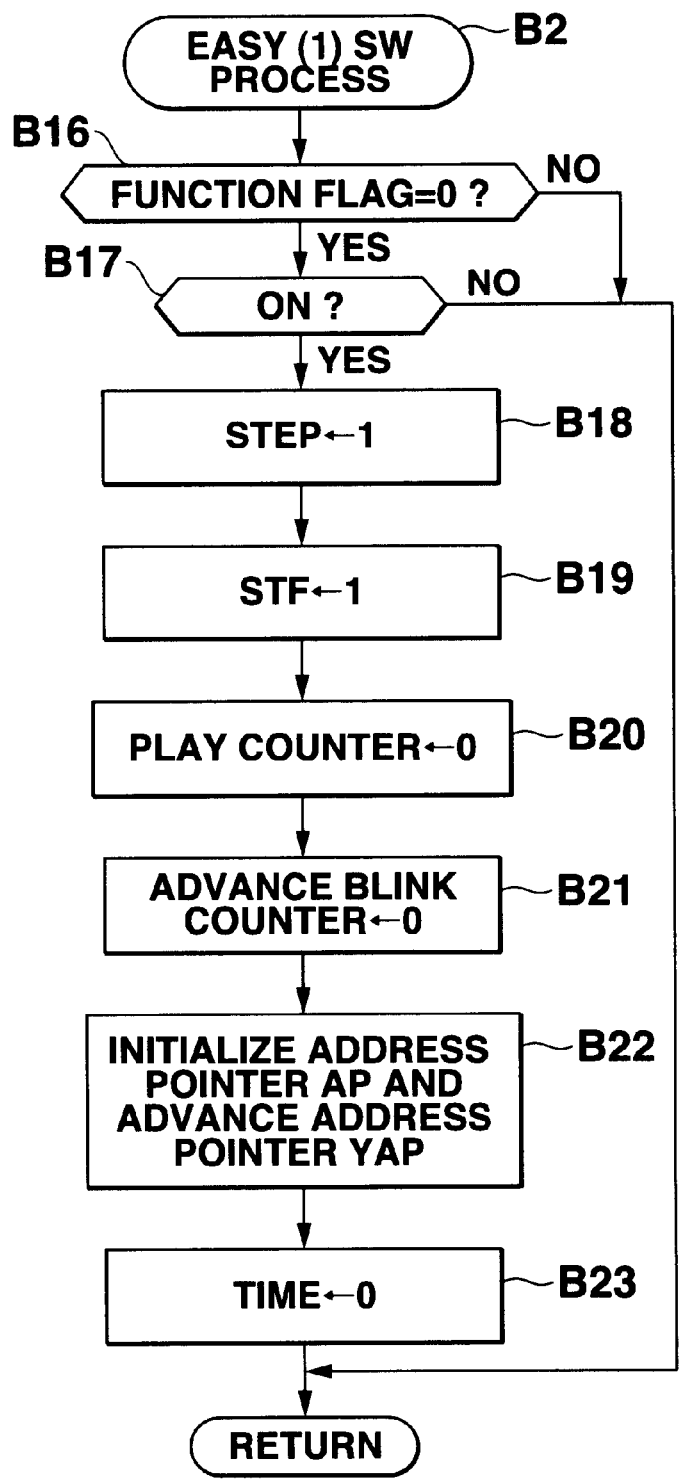
FIG. 12 is a flow chart of an easy (1) switch process.

FIG. 12 is a flow chart of easy (1) switch process B2 in FIG. 9. In the play setting mode with the function flag of "0" (B16), when the easy (1) switch is turned on (B17), then STEP register is set to "1" indicative of easy (1) mode. The start flag STF is set to "1" indicative of run of automatic performance (B19). The play counter is initialized to "0" (B20). The advance blink counter is initialized to "0" (B21). The address pointer AP and advance address pointer YAP are initialized (B22). Finally, TIME register is initialized to "0" (B23).

Figure 13:
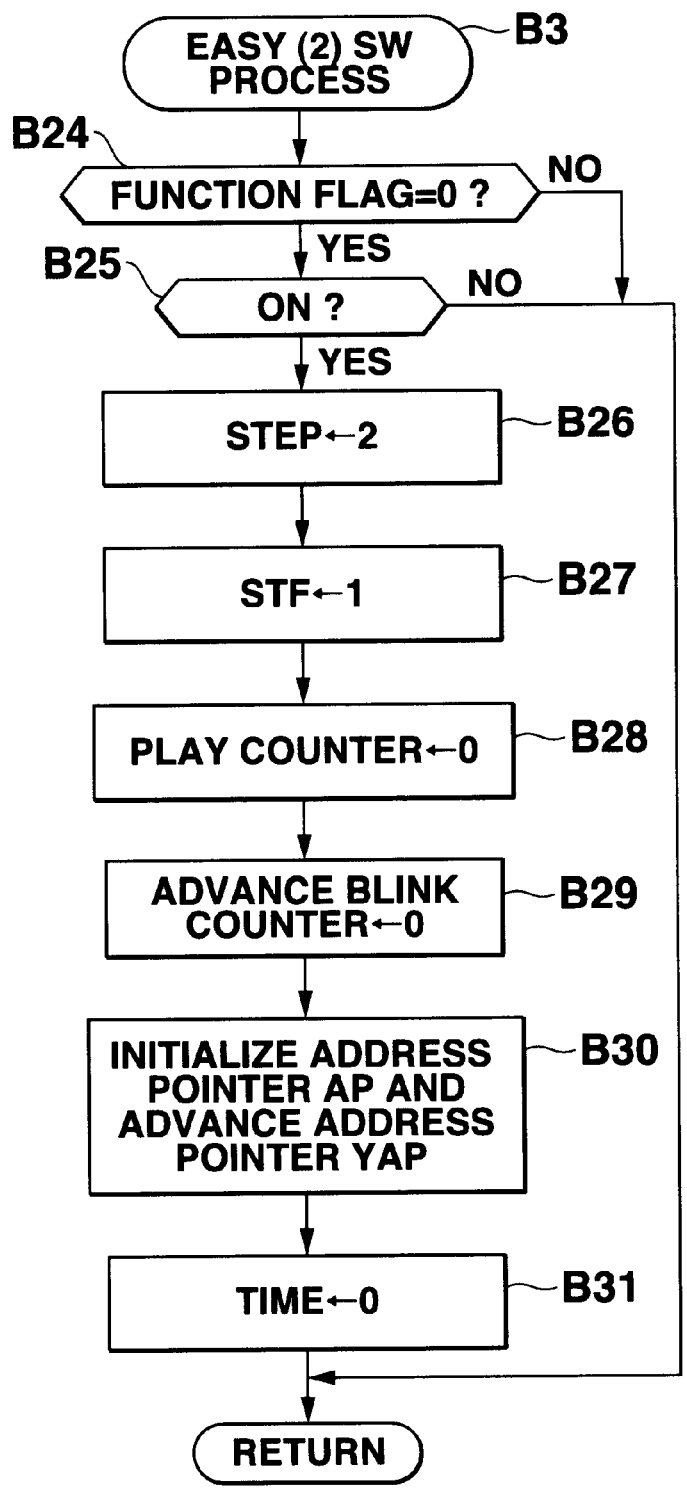
FIG. 13 is a flow chart of an easy (2) switch process.

FIG. 13 is a flow chart of the easy (2) switch process B3 in FIG. 9. In the play setting mode with function flag of "0" (B24), when the easy (2) switch is turned on (B25), the STEP register is set to "2" indicative of easy (2) lesson mode (B26), start flag STF is set to "0" (B27), the play counter is initialized to "0" (B28), the advance blink counter is initialized to "0" (B29), the address pointer AP and advance pointer YAP are initialized (B30) and TIME is initialized to "0" (B31).

Figure 14:
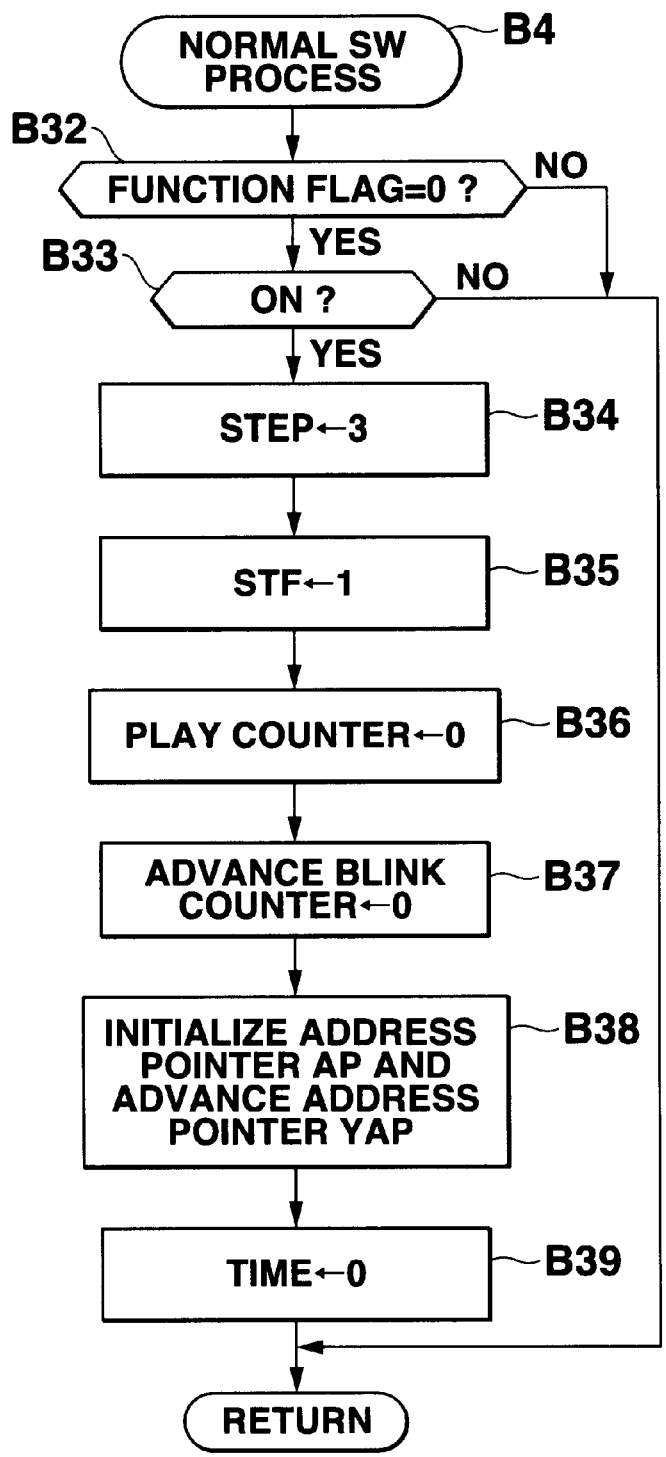
FIG. 14 is a flow chart of a normal switch process.

FIG. 14 is a flow chart of the normal switch process B4 in FIG. 9. In the play setting mode with the function flag of "0" (B32), when the normal switch is turned on (B33), STEP register is set to "3" indicative of normal lesson mode (B34), start flag STF is set to "1" indicative of run of automatic performance (B35), the play counter is initialized to "0" (B36), the advance blink counter is initialized to "0" (B37), the address pointer AP and advance address pointer YAP are initialized (B38) and TIME register is initialized to "0" (B39).

FIG. 15 is a flow chart of the play switch process B5 in FIG. 9. In the play setting mode with function flag=0" (B40), when the play switch is turned on (B41), STEP register is set to "0" indicative of normal automatic performance mode (B42), start flag STF is set to "1" indicative of run of automatic performance (B43), the play counter is initialized to "0" (B44), address pointer AP and advance address pointer YAP are initialized (B45) and TIME register is initialized to "0" (B46).

Figure 16:
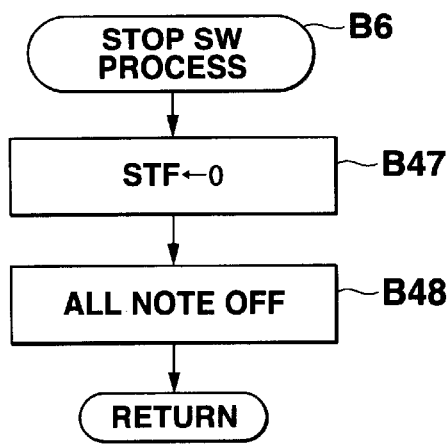
FIG. 16 is a flow chart of a stop switch process.

FIG. 16 is a flow chart of the stop switch process B6 in FIG. 9. When the stop switch is turned on, the process B6 resets start flag STF to "0" indicative of stop of automatic performance (B47) and sends an all note-off command to the tone generator in the keyboard instrument 20 (B48).

Figure 17:
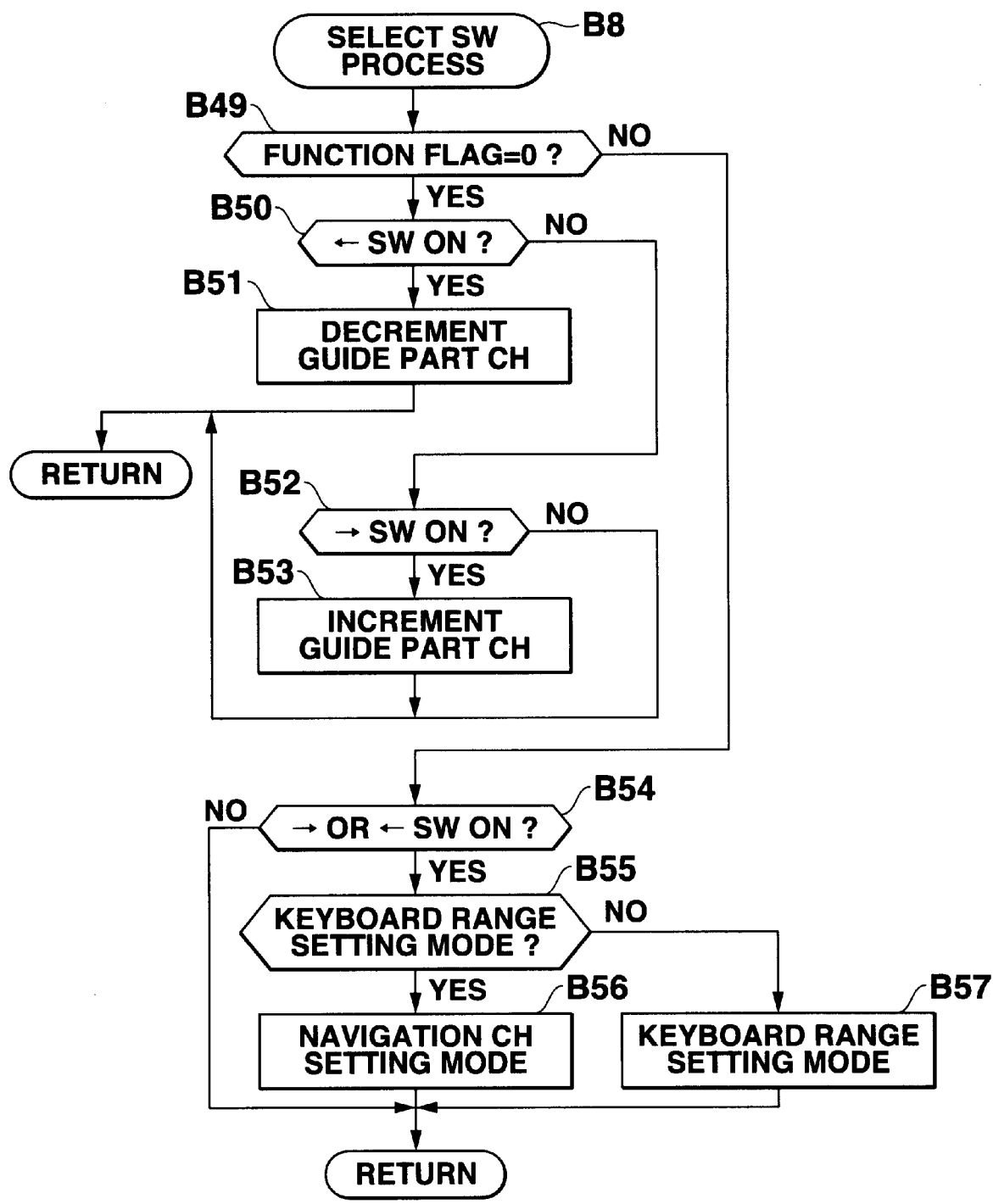
FIG. 17 is a flow chart of a select switch process.

FIG. 17 is a flow chart of the select switch process B8 in FIG. 9. In the play setting mode with function flag="0" (B49), when the select-left switch is turned on (B50), the guide part channel is decremented (B51). In the play setting mode, when the selects-right switch is turned on (B52), the guide part channel number is incremented (B53). In this manner, a user can easily select a desired part from music data of a plurality of musical parts stored in FD, as the musical part to be manually practiced for musical performance training.

In the function setting mode with function flag="1" (B49), when select-right or select-left switch is turned on (B54), it is checked if the function mode is keyboard range setting mode (B55). In the affirmative, the function mode is changed to navigation channel setting mode (B56). In the negative, the function mode is changed to the keyboard range setting mode (B57).

Figure 18:
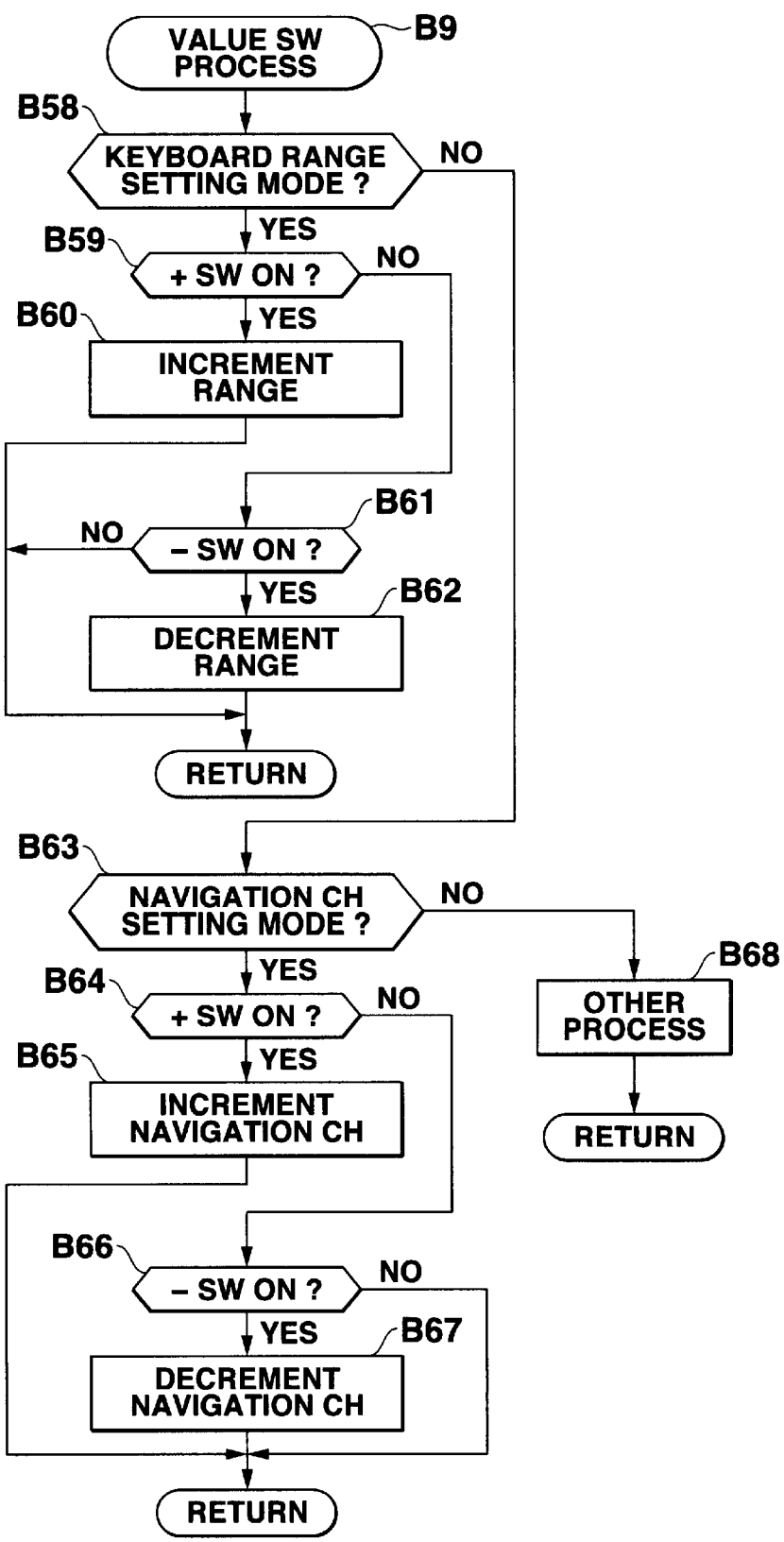
FIG. 18 is a flow chart of a value switch process.

FIG. 18 is a flow chart of the value switch process B9 in FIG. 9. In the keyboard range setting mode (B58), if the + switch is turned on (B59), RANGE register is incremented (B60). On the other hand if the − switch is turned on (B61). RANGE is decremented (B62). In this manner, RANGE register is updated so as to indicate the range of the musical keyboard in the keyboard instrument 20 connected to the apparatus 10.

In the navigation channel setting mode (B63), if the + switch is turned on (B64), the navigation channel number is incremented (B65). If the − switch is turned on (B66), the navigation channel number is decremented. In this manner, a user can easily input the navigation MIDI input channel of the keyboard instrument 20 which is fixedly used or preset by the instrument 20 for navigation i.e., controlling key light emitting elements.

If the current function mode is not the keyboard range setting mode or navigation channel setting mode (B58, B63), other process B68 is executed.

Figure 19:
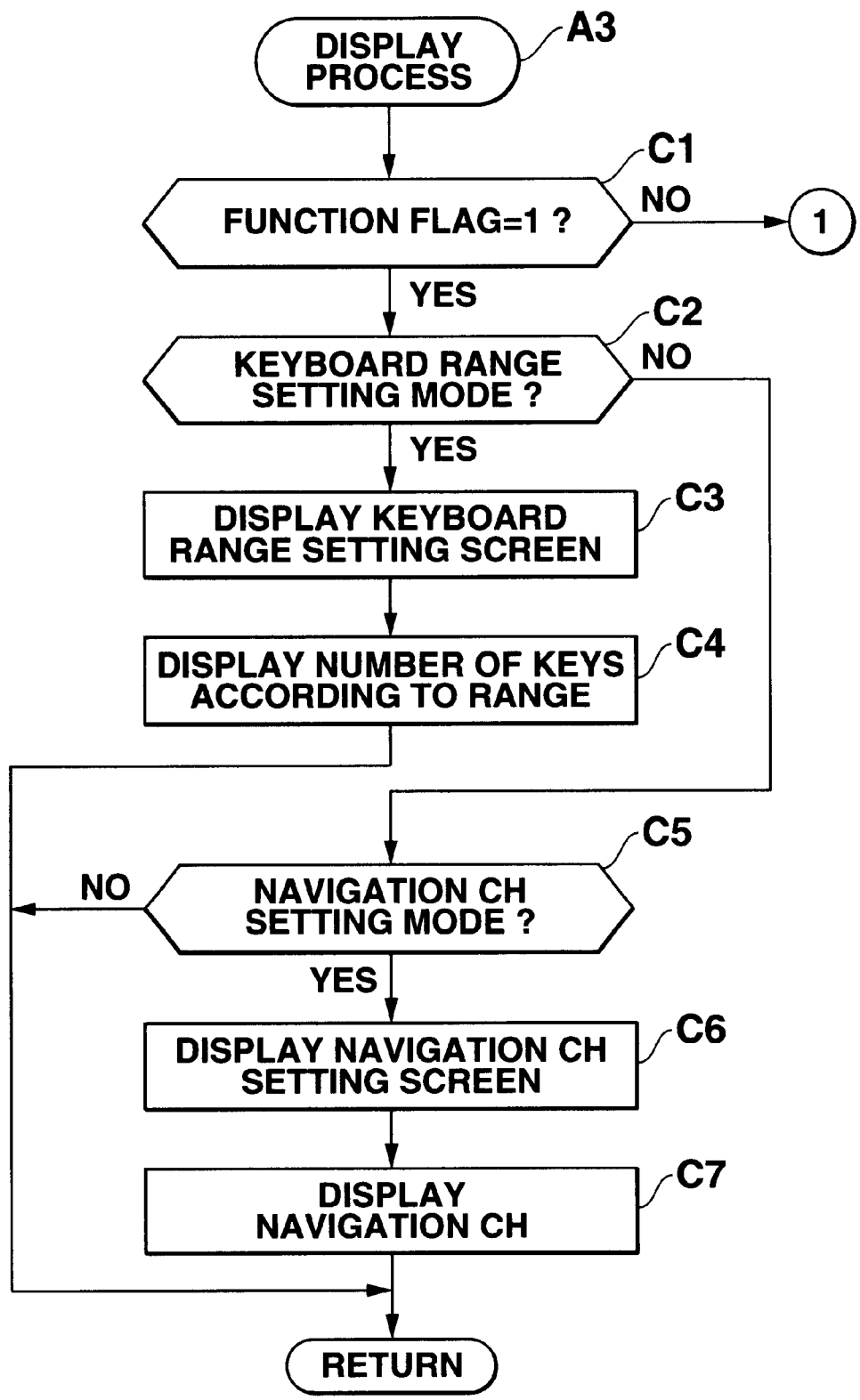
FIGS. 19 and 20 are flow charts of a display process.
Figure 20:
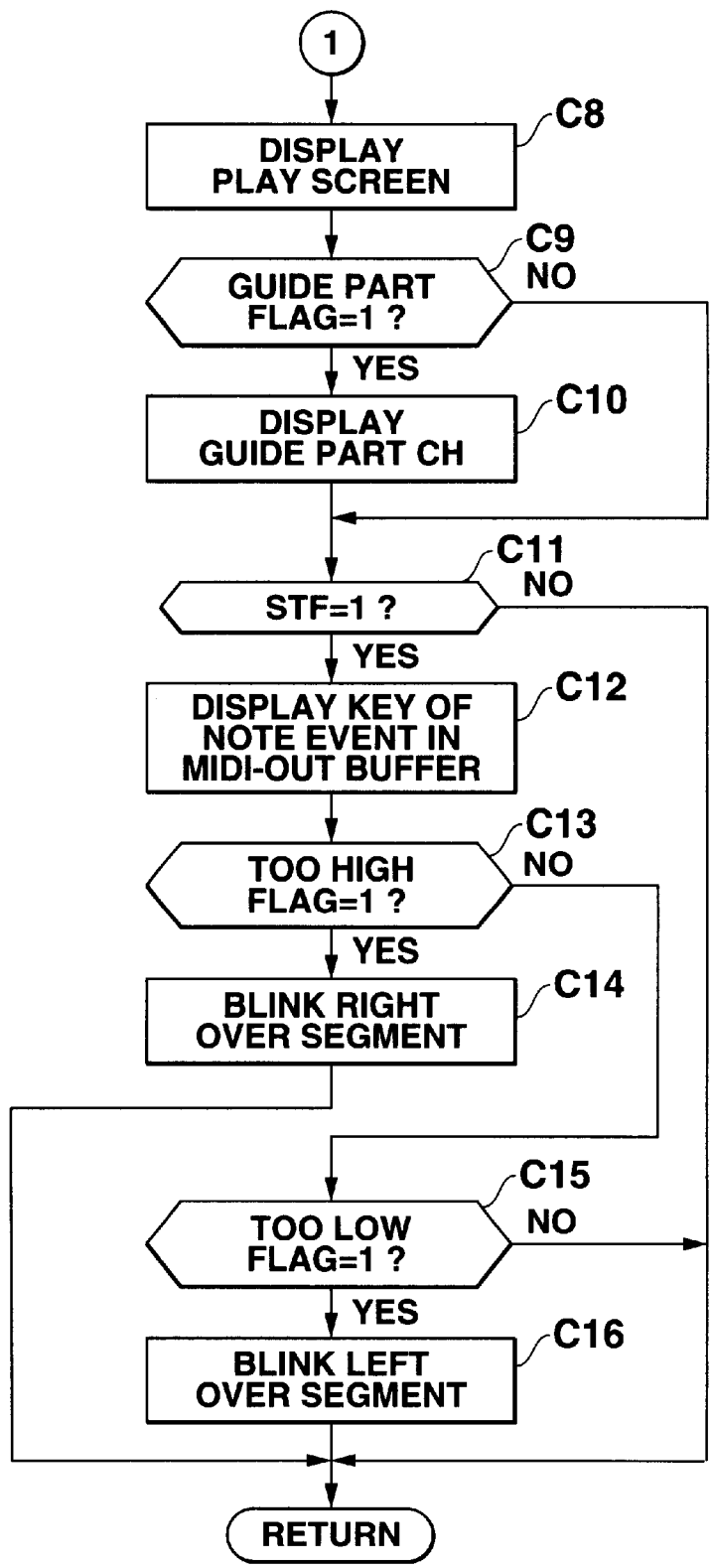

FIGS. 19 and 20 are flow charts of the display process A3 in FIG. 7. FIGS. 21A–E, FIG. 22 and FIGS. 23A–E show display screen examples on LCD 19. In the function setting mode with function flag=1 (C1 in FIG. 19), it is checked if the keyboard range setting mode is selected (C2). In the affirmative, the keyboard setting screen is displayed (C3) and the number of keys according to RANGE is displayed (C4). For the musical keyboard of 88 keys, RANGE is set to "88" by the value switch process B9 in FIG. 18. Thus the number of keys "88 keys" is indicated and all keys in the keyboard display area are blinked as shown in FIG. 21A. For RANGE=76, 76 keys in the keyboard display area are blinked and the number of keys "76 keys" is displayed as shown in FIG. 21B. Similarly, FIGS. 21C–E show display results for RANGE=73, 61 and 49, respectively.

Figure 22:
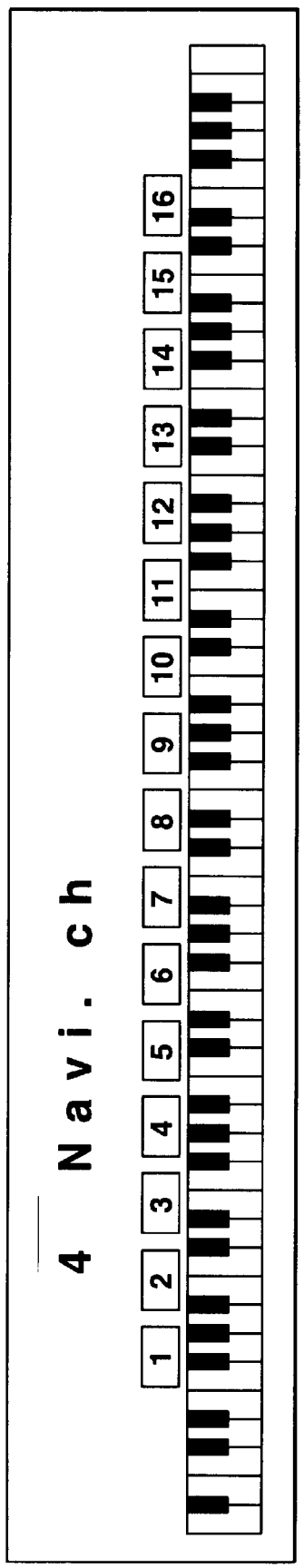
FIG. 22 is a view of a navigation channel setting screen displayed on LCD.

In FIG. 19, if the navigation channel setting mode is selected (C5), the navigation channel setting screen is displayed (C6) and the navigation channel is displayed (C7). For navigation channel number=4, for instance, "4 Navi.ch" is displayed as shown in FIG. 22.

In the play setting mode with function flag=0 (C1 in FIG. 19), the play screen is displayed (C8 in FIG. 20). In the case of normal automatic performance, channels 1–16 are all assigned to automatic performance channels so that they are distinctly displayed or highlighted as shown in FIG. 23A and bar marks of the note generating channels (first end fourth channels in FIG. 23A) are displayed.

After displaying the play screen (C8), the display process A3 checks if the guide part flag is "1" indicative of solo automatic performance (C9). In the affirmative, the guide part channel is highlighted (C10). For instance, when the fourth channel is selected as the guide part channel automatically played in solo, the bar mark of the guide part channel is highlighted as shown in FIG. 23B. In the lesson mode of "easy (1)", "easy (2)" or "normal", automatic performance channels other than the performance training channel are distinct displayed as shown in FIGS. 23C and D. In the stop of performance, no channel is note-generating so that bar marks of the channels 1–16 are all turned off as shown in FIG. 23E.

Back to FIG. 20, the display process A3 checks if the start flag STF is "1" indicative of run of play (C11). In the affirmative, the key(s) of the note event(s) in the MIDI-out buffer is (are) displayed (C12). Next, if the too-high flag is "1" indicative of out-of-range i.e., right-over (C13), the right-over segment is blinked (C14), as shown in FIGS. 23A, C–E. Similarly, if the too-low flag is "1" indicative of out-of-range i.e., left-over (C15), the left-over segment is blinked (C16) as shown in FIG. 23D.

FIGS. 24–33 are flow charts of the sequence process A5 in FIG. 7. In the running condition of play with STF=1 (D1 in FIG. 24), the sequence process A5 checks if the resolution time has elapsed (D2). The resolution time is a minimum music time which may be represented by one divided by integer multiple of a quarter note, for instance one 24th of quarter note. Thus, for tempo=120 quarter notes per minute and quarter note duration=500 milliseconds, the resolution time is about 21 milliseconds. If the resolution time has not elapsed, block D3 checks if wait flag is "0" indicative of not waiting for key operation by the player (user). In the affirmative, the process A5 terminates and returns to the flow of FIG. 17.

When the resolution time has elapsed (D2), block D5 checks if STEP="0" (normal automatic performance mode) or "3" (normal lesson mode). In the affirmative, block D5 increment the play counter. Block D6 checks if STEP is "0". In the affirmative, the normal play process D7 is executed before returning to the flow of FIG. 7.

Figure 25:
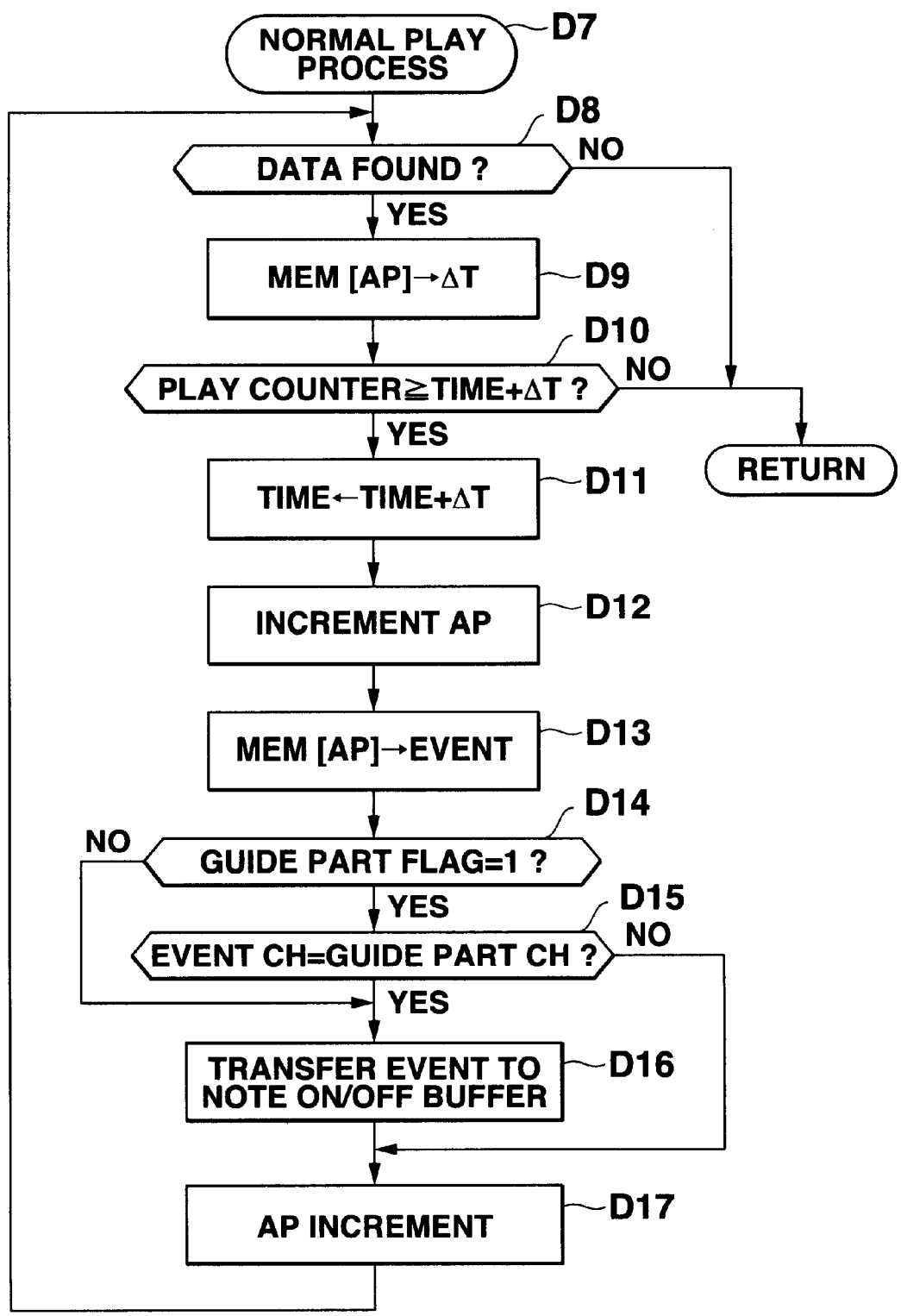
FIG. 25 is a flow chart of a normal play process in FIG. 24.

FIG. 25 is a flow chart of the normal play process D7. Block D8 checks if there remains more data in FD. In the negative (end of music), the normal play process D7 terminates. In the affirmative, block D9 loads delta time data MEM [ΔT] from music data storage of FD into ΔT register. The block D10 checks if the play counter is greater than or equal to TIME+ΔT, thus determining whether the next event time has come. In the negative, the normal play process D7 terminates.

When the next event time has come, block D11 updates TIME by incrementing TIME by ΔT. Block B12 increments FD address pointer AP. Block B13 reads event data MEM [AP] from FD and loads it into EVENT register in RAM. Then block B14 checks if the guide part flag is "1" indicative of solo play mode of the guide part. In the affirmative block B15 checks if the event channel is identical with the guide part channel. If the guide part flag is "0", or if the event channel is identical with the guide part channel with guide part flag=1, block B16 is executed to transfer EVENT register to the note on/off buffer so that the event is executed by keyboard instrument 20. After block B16, or if the event channel is different from the guide part channel with guide part flag=1 (D15), the normal play process D7 executes block D17 to increment address pointer AP and returns to the music data check block D8. In this manner, normal play process D7 plays the next event on the condition that the next event time has come.

Figure 24:
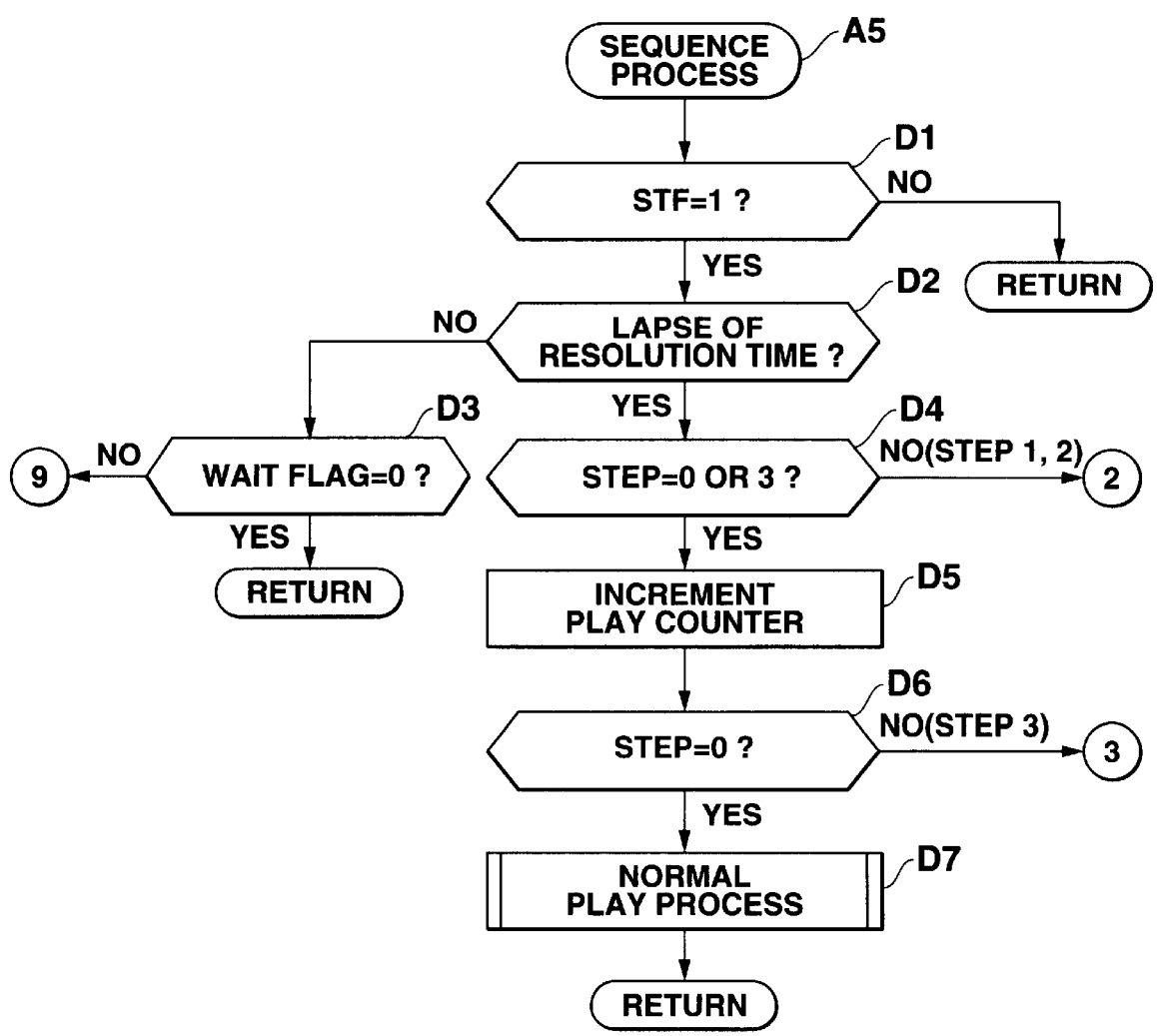
FIG. 24 is a flow chart of a first part of a sequence process in FIG. 7.
Figure 26:
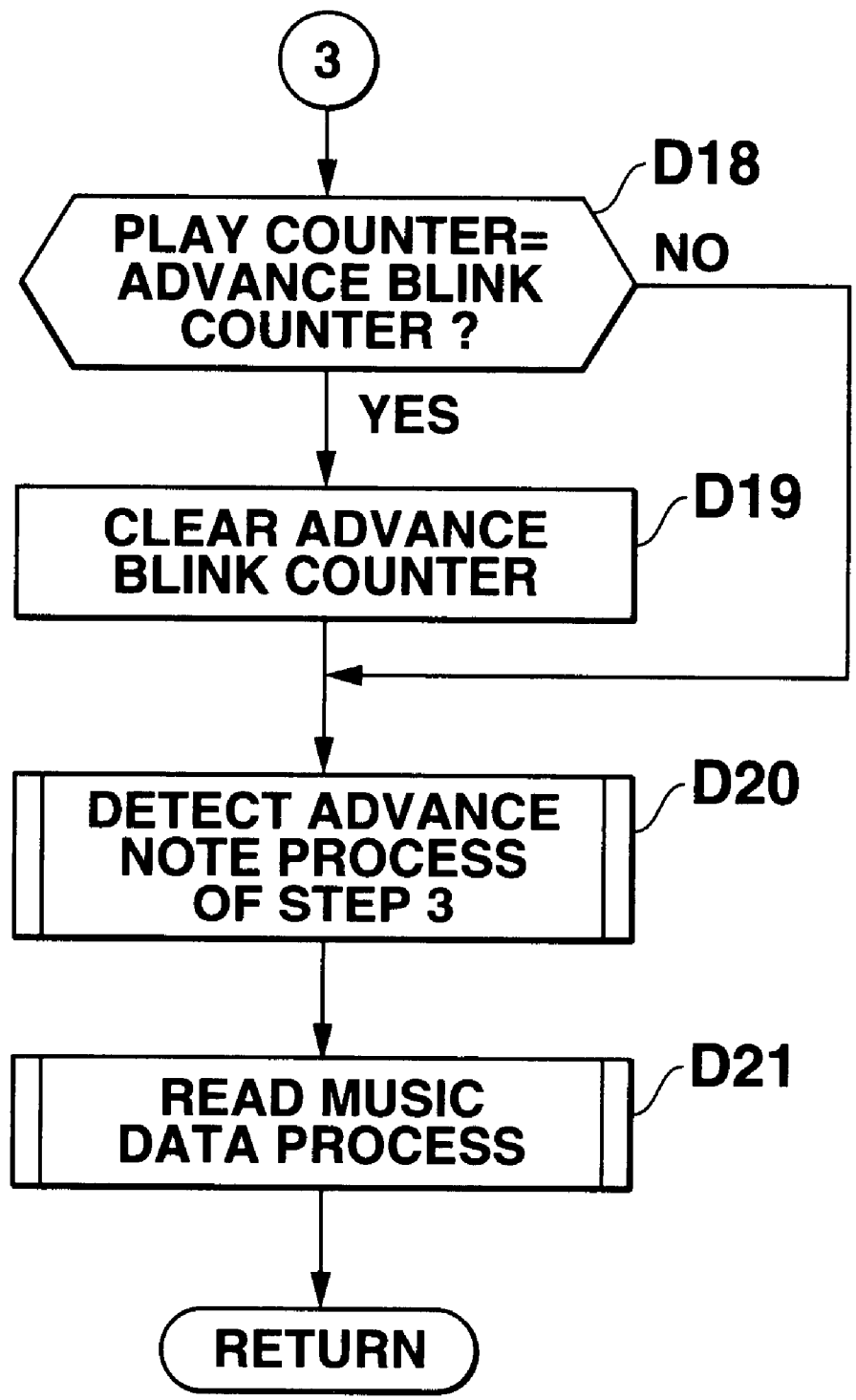
FIG. 26 is a flow chart showing a further part of the sequence process.

Back to FIG. 24, when the step check block B6 has found STEP≠0 (i.e., STEP=3 indicative of normal lesson mode), block D18 in FIG. 26 checks if the play counter is equal to the advance blank counter, thus determining whether the time of required key operation has come. In the affirmative, block D19 clears the advance blink buffer. After block B19 or when the play counter value is different from the advance blink counter value (D18), the sequence process A5 executes the detect advance note process of step 3, designated D20, executes the read music data process D21 and returns to the main routine of FIG. 7.

Figure 27:
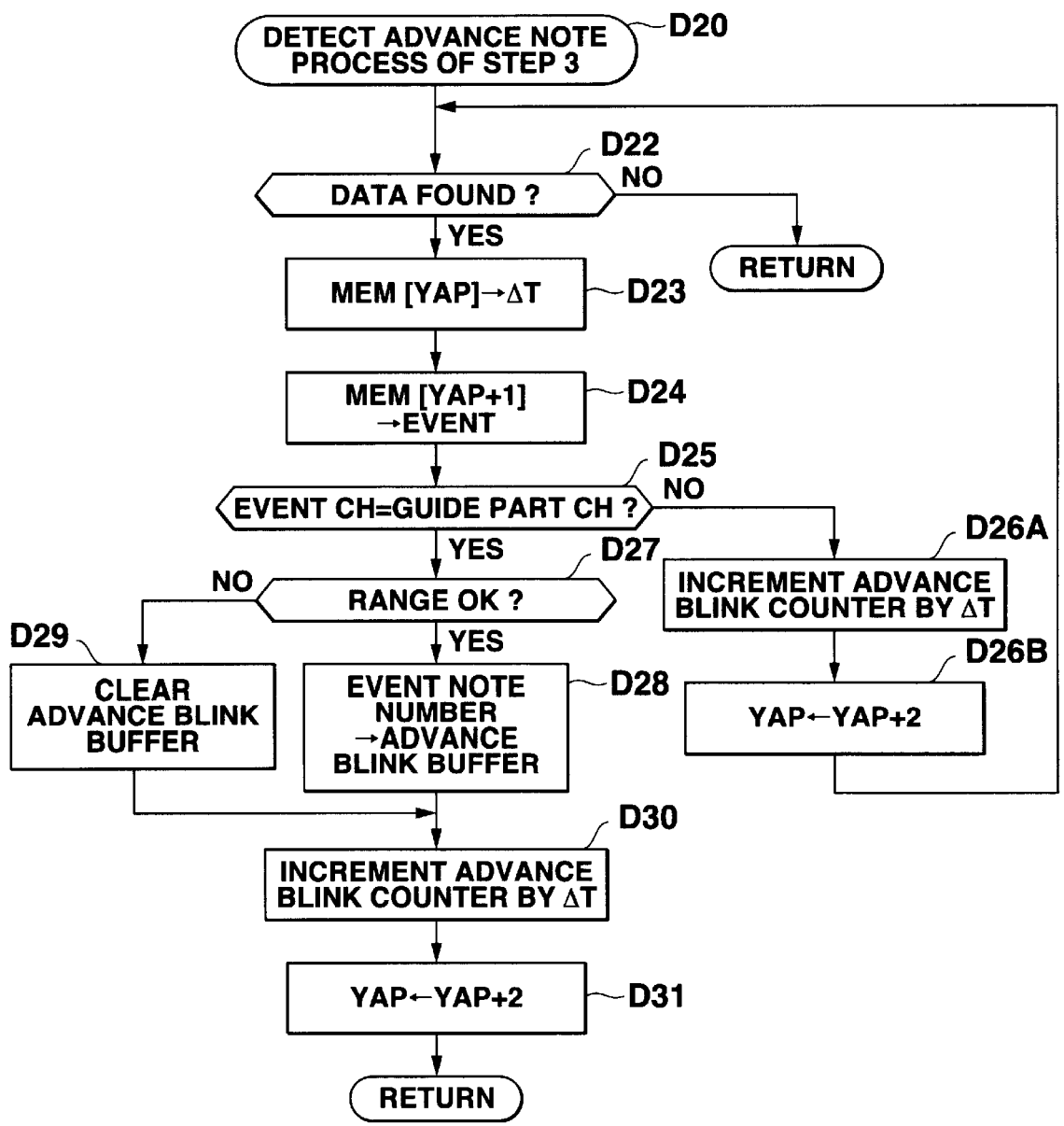
FIG. 27 is a flow chart of a detect advance note process of step 3 shown in FIG. 26.

FIG. 27 is a flow chart of the detect advance note process of step 3, called in block D20 in FIG. 26. Block D22 checks if there still remains music data FD. In the negative (meaning end of music) the detect advance note process of step 3 terminates. In the affirmative, block D23 reads delta time data MEM [YAP] from FD and loads it into ΔT register. Block D24 reads the next event data MEM [YAP+1] from FD and loads it into EVENT register. Then block D25 checks if the event channel is identical with the guide part channel.

In the negative, block D26A increments the advance blink counter by ΔT and block D26B increments the advance address pointer YAP by 2 and the process D20 returns to the data check block D22. In this manner, the loop of D22–D28B searches the stored music data to find the next event of the guide part.

When the next event of the guide part is found (D25), block D27 checks if the event note is within the keyboard range.

In the affirmative, block D28 loads the event note into the advance blink buffer. In the negative, the advance blink buffer is cleared since the event note of interest cannot be played by the musical keyboard of the instrument 20 (D29). After block D28 or D29, the detect advance note process D20 increments the advance blink counter by ΔT (D30), increments the advance address pointer YAP by 2 and returns to the flow of FIG. 26.

Figure 28:
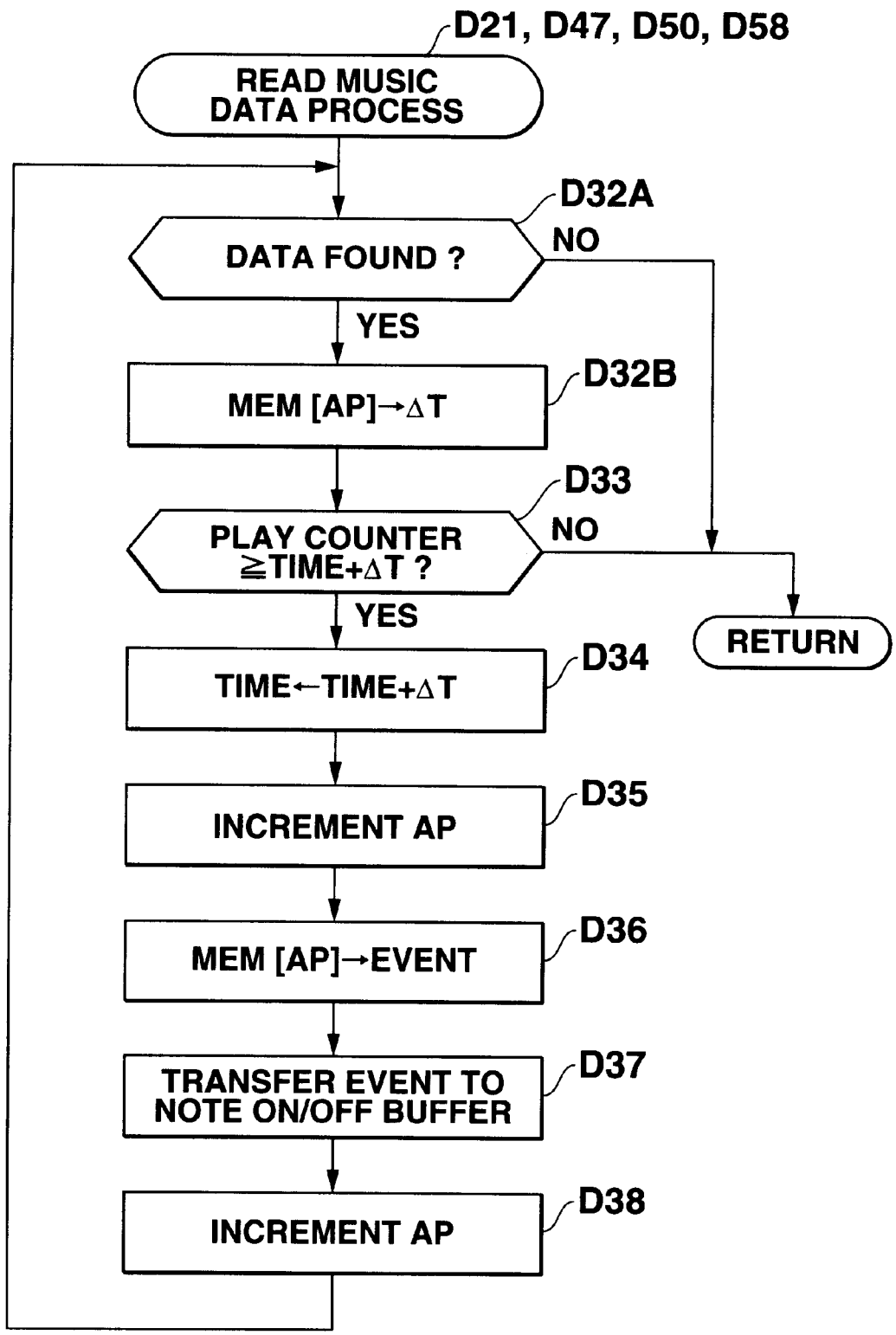
FIG. 28 is a flow chart of a read music data process shown in FIGS. 26, 29, 30 or 31.

FIG. 28 is a flow chart of the read music data process called in block D21, D47, D50 or D58. Block D32A checks if there remains more music data in FD. In the negative (meaning end of a music piece), the read music data process terminates. In the affirmative, block D32B reads delta time data MEM [AP] from FD and loads it into ΔT register. Then block D33 checks if the play counter value is greater than or equal to TIME+ΔT, thus determining whether the next event time has come. In the negative, the read music data process terminates. In the affirmative, block D34 increments TIME by ΔT. Block D35 increments address pointer AP. Block D36 reads event data MEM [AP] from FD end loads it into EVENT register. Block D37 transfers the EVENT to the note on/off buffer so that the event may be sent to and executed by the instrument 20. Block D38 increments the address pointer AP. Then the read music data process returns to the data check block D32A.

Figure 29:
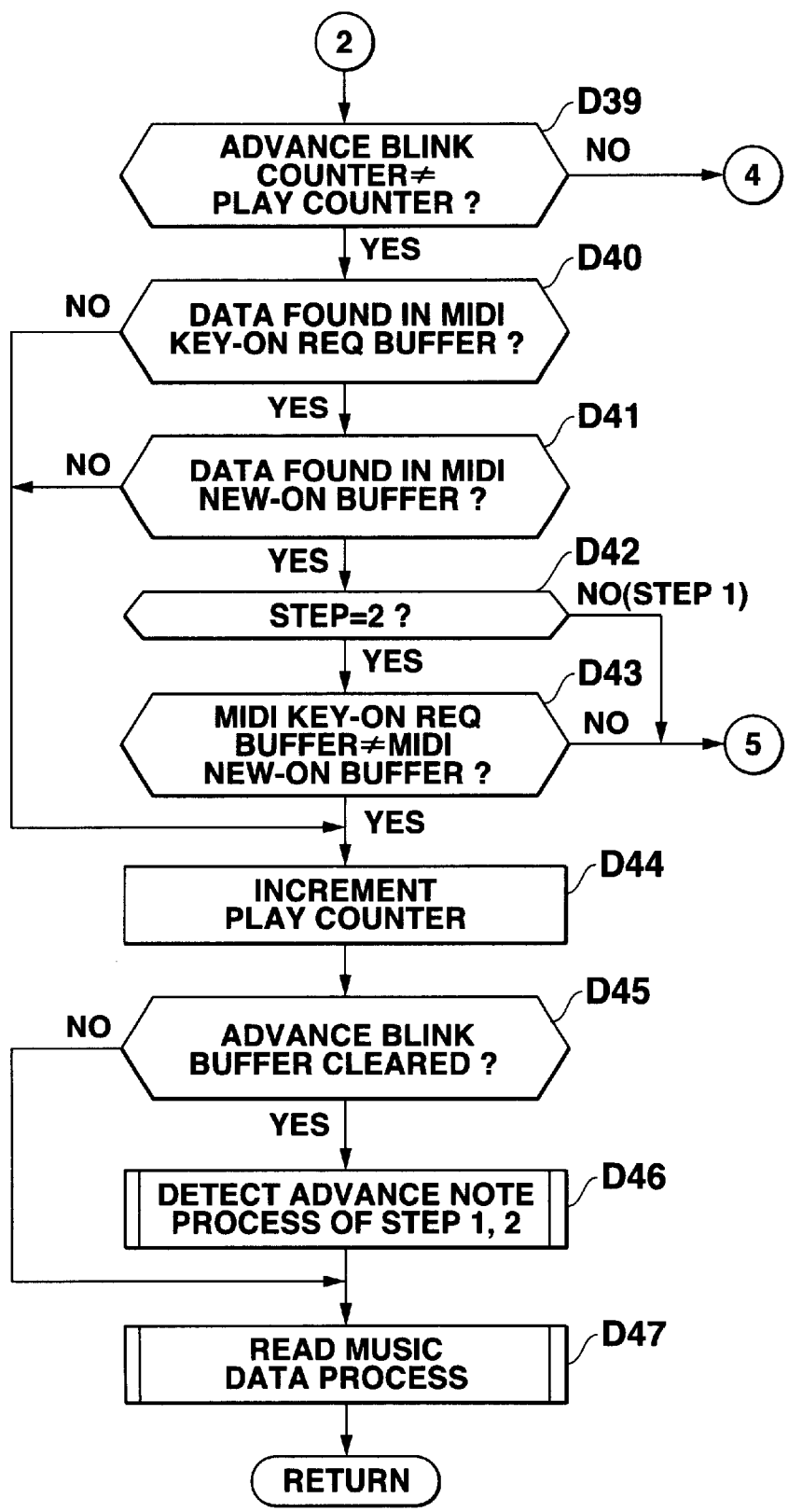
FIGS. 29–31 are flow charts showing further parts of the sequence process.

Back to the sequence process A5 in FIG. 24, when the block D4 has found that STEP is equal to "1" (easy (1) lesson mode) or "2" (easy (2) lesson mode), block D39 in FIG. 29 is executed to check if the advance blink counter value is not equal to the play counter value, thus determining whether the time of required key operation has not yet passed.

If this is the case, the block D40 checks if data is found in the MIDI key-on request buffer. This is the case when the apparatus 10 has notified the user of the instrument 20 of a performance training note to be played next. Thus, block D41 checks if data is found in the MIDI new-on buffer. This is the case when a key was operated on the keyboard instrument 20 before the required time of key operation. Then block D42 checks if STEP is "2" (easy (2) lesson mode in which the user is required to play a correct key). In the case of STEP=2,block D43 is executed check if the MIDI key-on buffer data is identical with the MIDI new-on buffer data, thus determining whether the correct key has been operated.

If no data is found in MIDI key-on request buffer (D40) or if no data is found in MIDI new-on buffer (D41) or if the MIDI new-on buffer note (the note played by the user) is different from note in the MIDI key-on request buffer in the easy (2) lesson mode (STEP=2), block D44 is executed to increment the play counter by one resolution time. Then block D44 checks if the advance blink buffer is cleared. In the affirmative, the detect advance note process of step 1, 2, designated D46 is executed. The block D46 is skipped when the advance blink buffer is not cleared. Then the read music data process D47 is executed. Then the sequence process A5 terminates and returns to the main routine.

Figure 30:
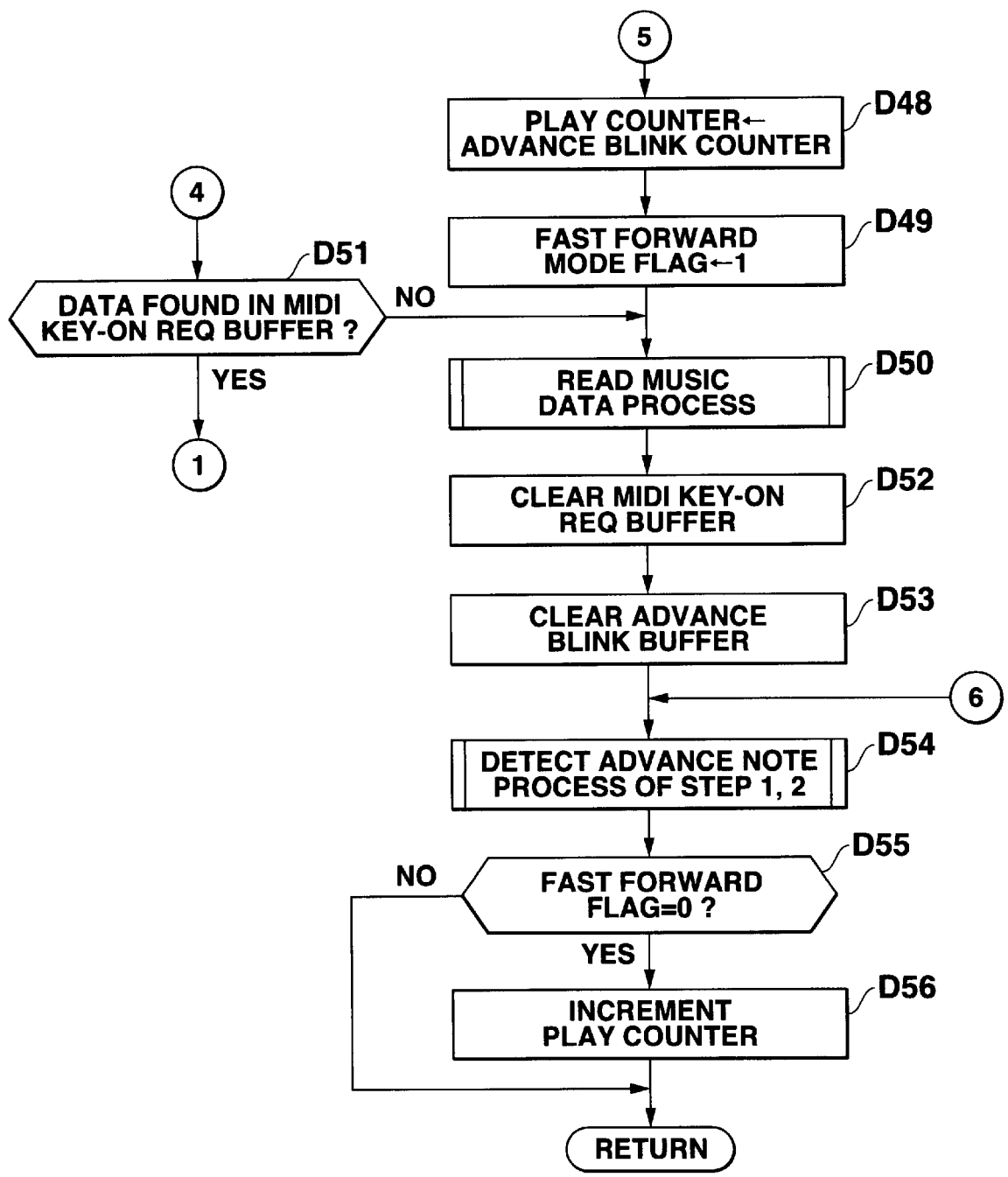

When a key was operated in the easy (1) lesson mode (STEP=1) before the required key operation time, or when the correct key was operated in the easy (2) lesson mode (STEP=2) before the required key operation time, then block D48 in FIG. 30 is executed to advance the play counter to the advance blink counter value. Block D49 sets the fast forward mode flag to "1" indicative of fast forward. Then the read music data process D50 is executed to read music data as far as the time of the play counter.

When a key operation time or note-on time of the musical performance training part has come, block D39 in FIG. 29 finds that the play counter reaches the advance counter value. Then block D51 in FIG. 30 checks if data is found in the MIDI key-on request buffer. In the negative (in the case of the note of out-of-the keyboard range), the read music data process D50 is executed.

After the read music data process D50, block D52 clears the MIDI key-on request buffer. Block D53 clears the advance blink buffer. Then the block D54 executes a detect advance note process of step 1,2. Block D55 checks if the fast forward flag is "0". In the affirmative, the play counter is incremented (D56). After the block D56, or when the block D55 finds that the fast forward flag is "1", the sequence process A5 terminates.

Figure 31:
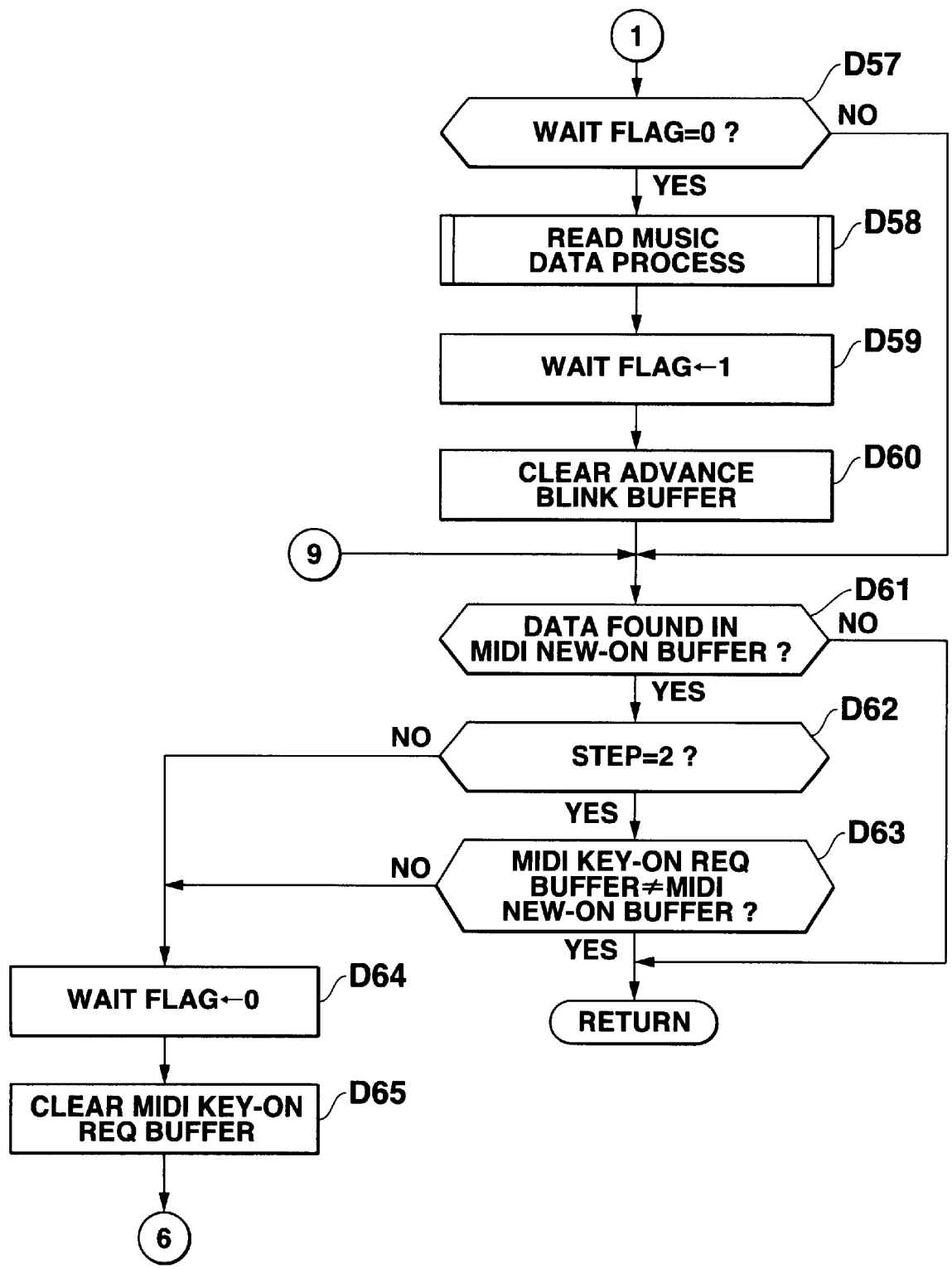

When the block D51 in FIG. 30 does not find data in the MIDI key-on request buffer, block D57 in FIG. 31 is executed to check if the wait flag is "0". In the affirmative, block D58 executes the read music data process. Block D59 sets the wait flag to "1" indicative of waiting for user's key operation. Block D60 clears the advance blink buffer. In the negative (D57), the blocks D58–D60 are skipped. After the block D60, or when the block D57 finds that the wait flag is "1" or when the block D3 in FIG. 24 finds that the wait flag is "1", the block D61 checks if there is data in the MIDI new-on buffer. In the negative, the sequence process A5 terminates. In the affirmative, block 62 checks if STEP is "2" indicative of the easy (2) lesson mode. In the affirmative, block D63 checks if the MIDI key-on request buffer data is different from the MIDI new-on buffer data. If this is the case, the sequence process A5 terminates. If STEP is not equal to "2" (D62), or if the MIDI key-on request buffer is identical with the MIDI new-on buffer with STEP=2 (D63), the block B64 resets wait flag to "0". Block D65 clears the MIDI key-on request buffer. Then the block B54 in FIG. 30 executes the detect advance note process of step 1, 2.

Figure 32:
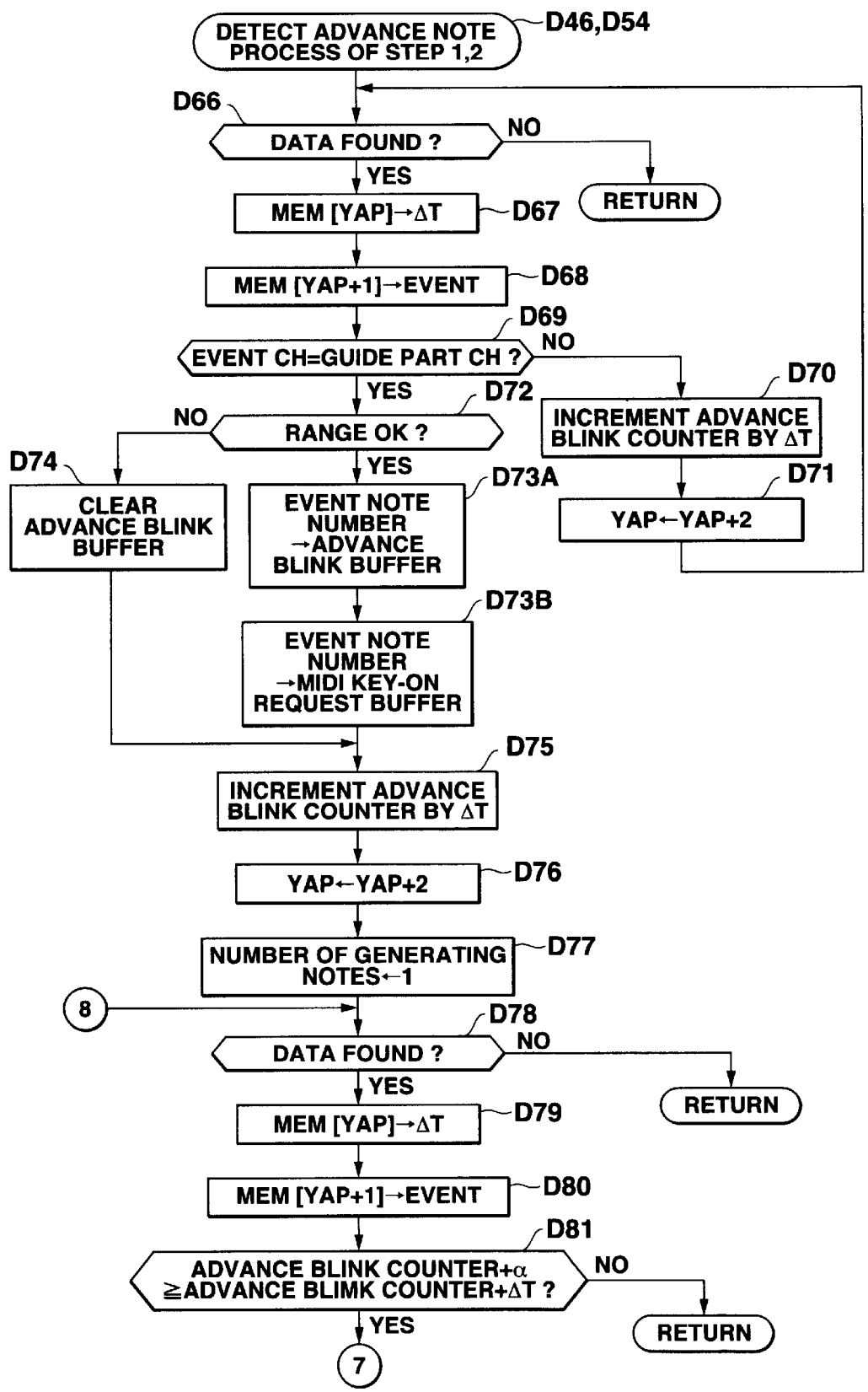
FIGS. 32 and 33 are flow charts showing a detect advance note process of step 1, 2, shown in FIGS. 29 and 30.
Figure 33:
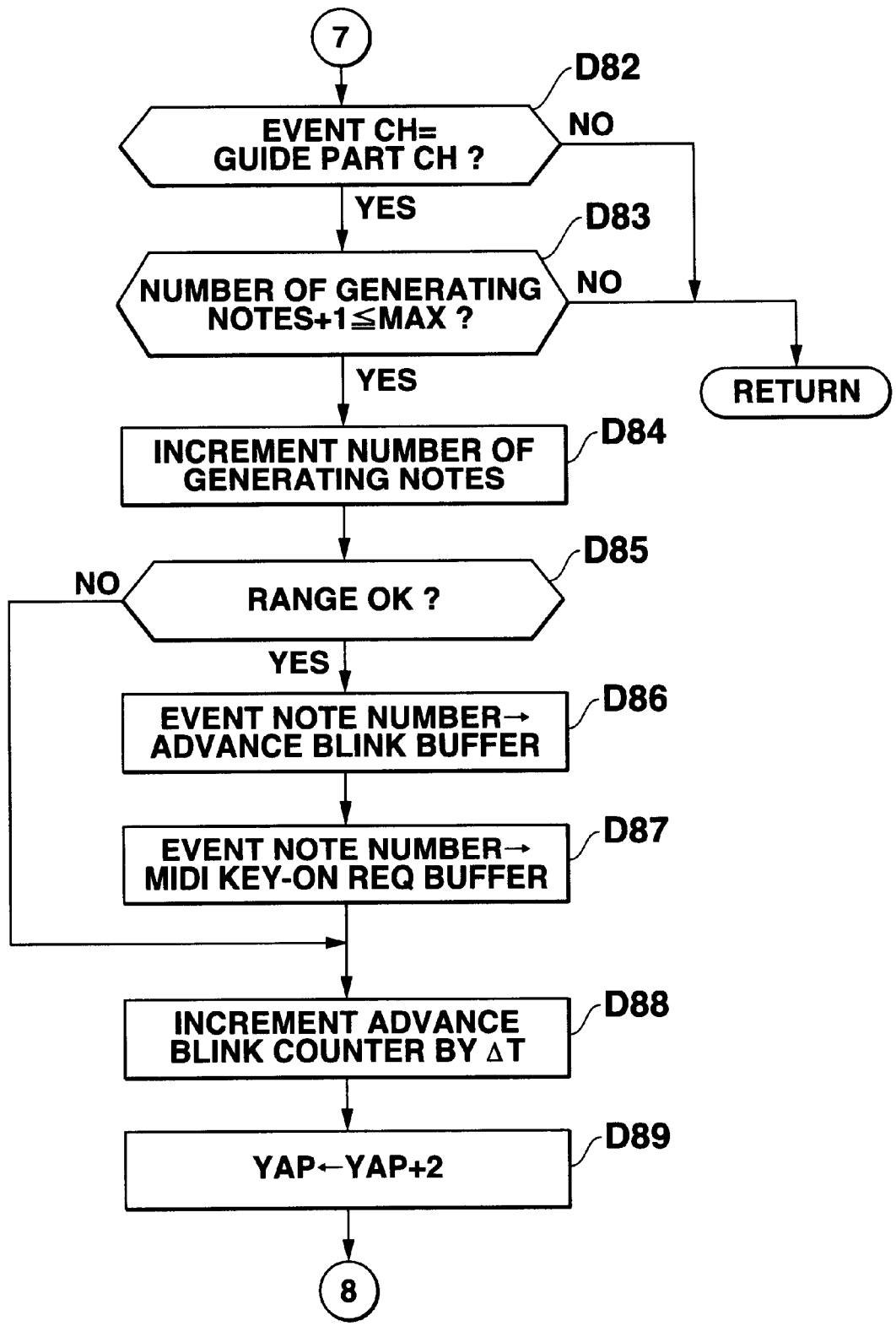
Figure 39:
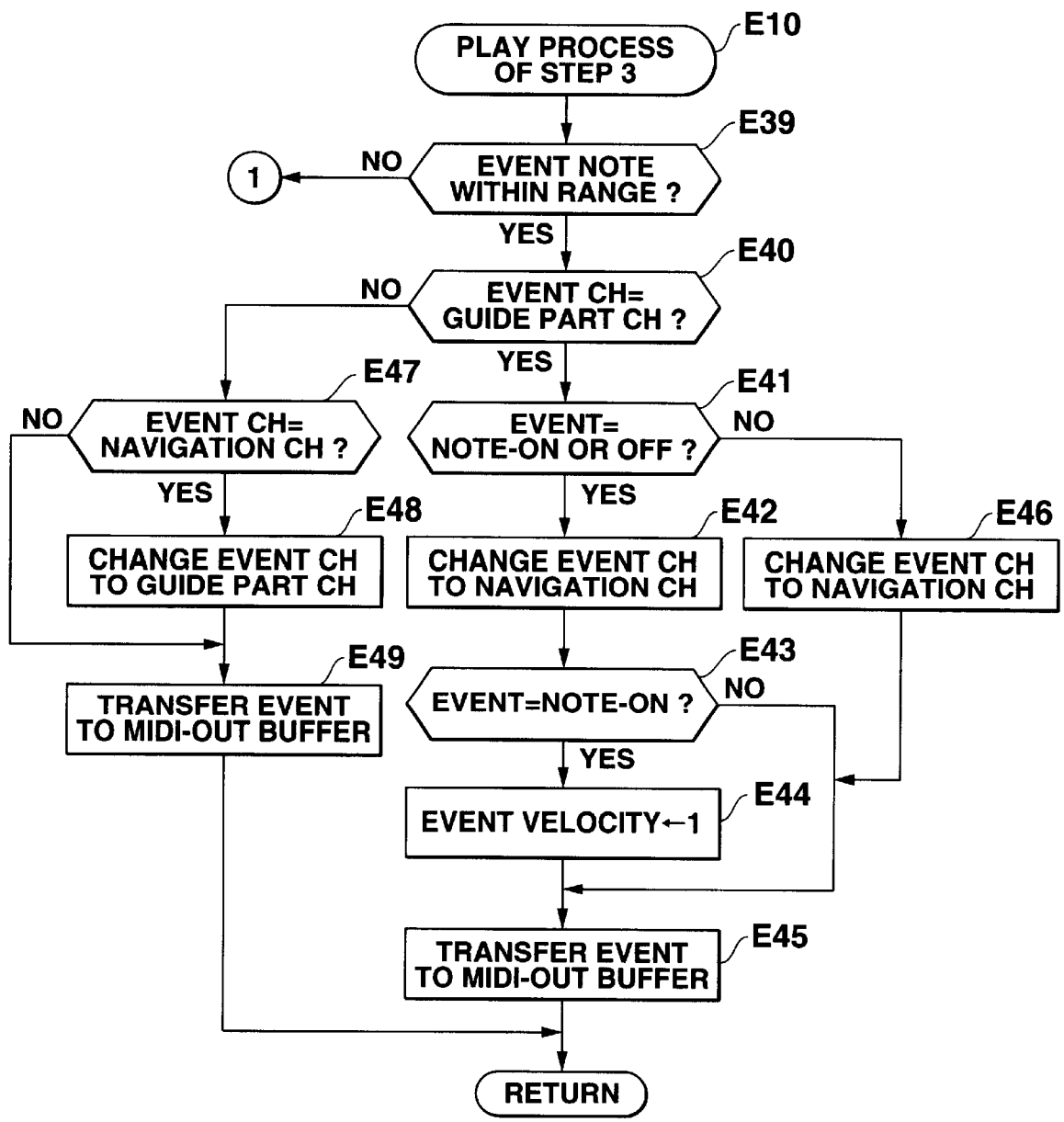
FIGS. 39 and 40 are flow charts of a play process of step 3 in FIG. 34.

FIGS. 32 and 33 are flow charts of the detect advance note process of step 1, 2 called in block D46 in FIG. 29 or block D54 in FIG. 39. Block D66 checks if there remains music data in FD (floppy disk). In the negative (meaning end of music), the detect advance note process of step 1,2 terminates. In the affirmative, block D67 reads the delta time data MEM [YAP] from FD, pointed to by the advance address pointer YAP, and loads it into ΔT register. Block D66 reads the next data MEM [YAP+1] from FD, indicative of the next event, into EVENT register. Then block D69 checks if the musical part channel of EVENT is identical with the guide part channel. In the negative, block D70 increments the advance blink counter by ΔT. Block D71 increments the advance address pointer by "2". Then the process returns to the data check block D66. In this manner, the loop of D66–D71 repeats until the next event of the guide part channel is found in block D69.

Then, block D72 checks if the note of EVENT is within the keyboard range RANGE. In the affirmative, the block D73A loads the note of EVENT into the advance blink buffer. Block D73B loads the note of EVENT into the MIDI key-on request buffer. In the negative (in the case of the note out-of-the keyboard range), block D74 clears the advance blink buffer. Then, block D75 increments the advance blink counter by ΔT. Block D 76 increments the advance address pointer YAP by "2". Then block D77 sets the number of generating notes to "1".

Then block D78 reads MEM [YAP] from FD and checks if it indicates data (other than end-of-music code). In the negative, the detect advance note process of step 1, 2 terminates. In the affirmative, MEM [YAP] from FD indicates delta time data so that block D79 loads the delta time data MEM [YAP] into ΔT register. Block D80 reads the next event data MEM [YAP] from FD and loads it into EVENT register. Then, block D81 checks if advance blink counter +α≧advance blink counter+ΔT, thus determining whether then note of EVENT read this time (D80) and the note of event previously read can be chord notes to be played or generated simultaneously. In the negative, the detect advance note process of step 1, 2 terminates since the note of EVENT now read is not a chord note.

If the block D81 has found that the note of EVENT now read can be a chord note to be simultaneously played with a previous note, block D82 in FIG. 33 checks if the channel of EVENT is equal to the guide part channel, thus determining whether the note of EVENT of the guide part now read is a chord note to be simultaneously played with a previous note of the guide part. In the negative, the detect advance note process of step 1, 2 terminates. In the affirmative, block D83 checks if the number of generating notes +1≧MAX or polyphonic number of the instrument 20. In the negative, the detect advance note process of step 1,2 terminates, because of the poliphonic limit (MAX) of the keyboard instrument 20.

In the affirmative (D83), block D84 increments the number of generating notes. Block D85 checks if the note of EVENT is within the keyboard range RANGE. In the affirmative, block D86 loads the note number of EVENT into the advance blink buffer. Block D87 loads the note number of EVENT into the MIDI key-on request buffer. After block D87 or in the case of the note out-of-range (D85), block D88 increments the advance blink counter by ΔT. Block D89 increments the advance address pointer by "2". Then the process returns to the musical data check block D78 in FIG. 32. In this manner, the loop of D78–D89 searches the music data FD, and finds note events of the guide part channel to be played simultaneously as many as there are, within the polyphonic ability of the keyboard instrument.

Figure 34:
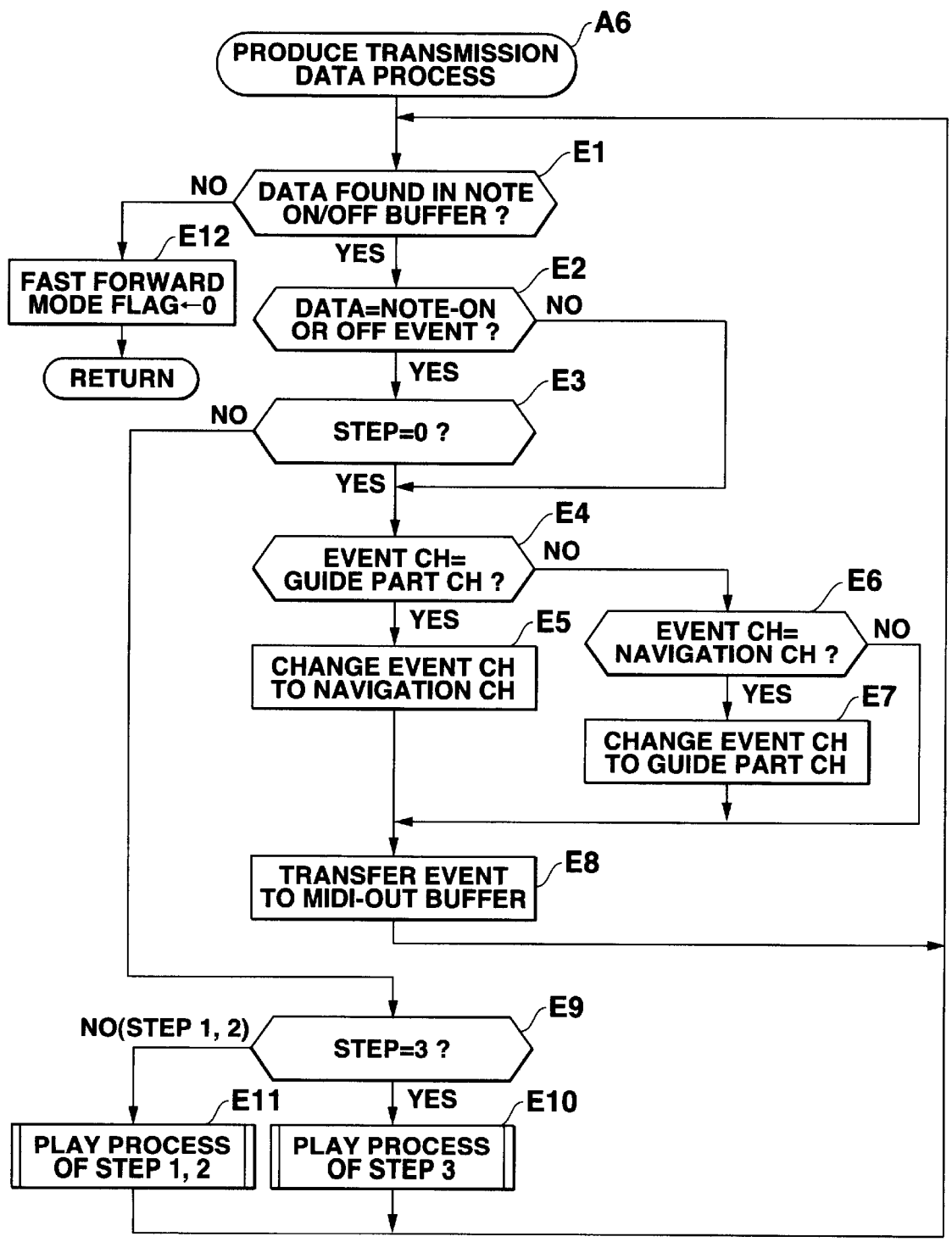
FIG. 34 is a flow chart of a produce transmission data process in FIG. 7.
Figure 35:
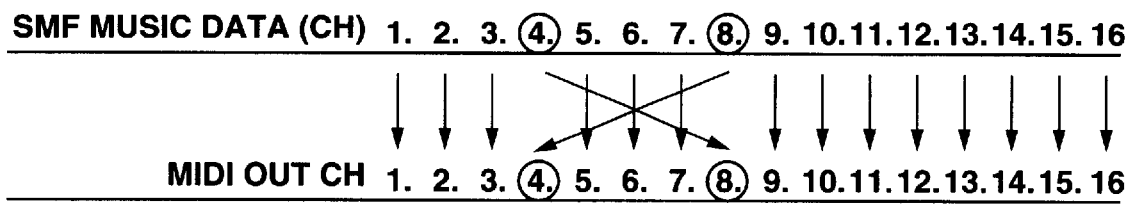
FIG. 35 is a diagram showing changing channels in the produce transmission data process.

FIG. 34 is a flow chart of the produce transmission data process A6 in FIG. 7. Block E1 checks if there remains more data in the note on/off buffer. In the affirmative, block E2 checks if the data is a note event (note-on or off event). If this is the case, block E3 checks if the step="0" indicative of normal automatic performance. When step="0" (E3) or when the data is not a note event (E2), block E4 checks if the event channel is identical with the guide part channel. In the affirmative, block E5 changes the event channel to the navigation channel. In the negative, block E6 checks if the event channel is identical with the navigation channel. In the affirmative block E7 changes the event channel to the guide part channel.

Then, block E8 transfers the event to the MIDI-out buffer. For instance, 8th channel of SMF (standard MIDI file) music data stored in FD15 may be selected as the guide part i.e., musical part to be played by the player (user) for performance training whereas fourth channel of MIDI-out may be selected as navigation channel for carrying the music part data to be played by the user for performance training. In this case, 8th channel event data in the stored music data is changed or assigned to 4th channel MIDI-out data. It is also necessary to change or assign 4th channel event data in the stored music data to 8th channel MIDI-out data. For channels other than the guide part channel of the stored music data or navigation channel of MIDI-out, no channel change is required. After block E8, the process A6 returns to the data check block E1.

If STEP is not equal to "0" (E3), block E9 checks if STEP is "3" indicative of normal lesson mode in which automatic performance proceeds without waiting for key operations by the player (user). In the affirmative, block E10 executes the play process of step 3. In the negative ( step 1, or 2), block E11 executes the play process of step 1, 2. After block E10 or E11, the produce transmission data process A6 returns to the note on/off buffer data check block E1. If no more data is found (E1), the process A6 executes the block E12 to reset the fast forward mode flag to "0" and returns to the main routine of FIG. 7.

Figure 36:
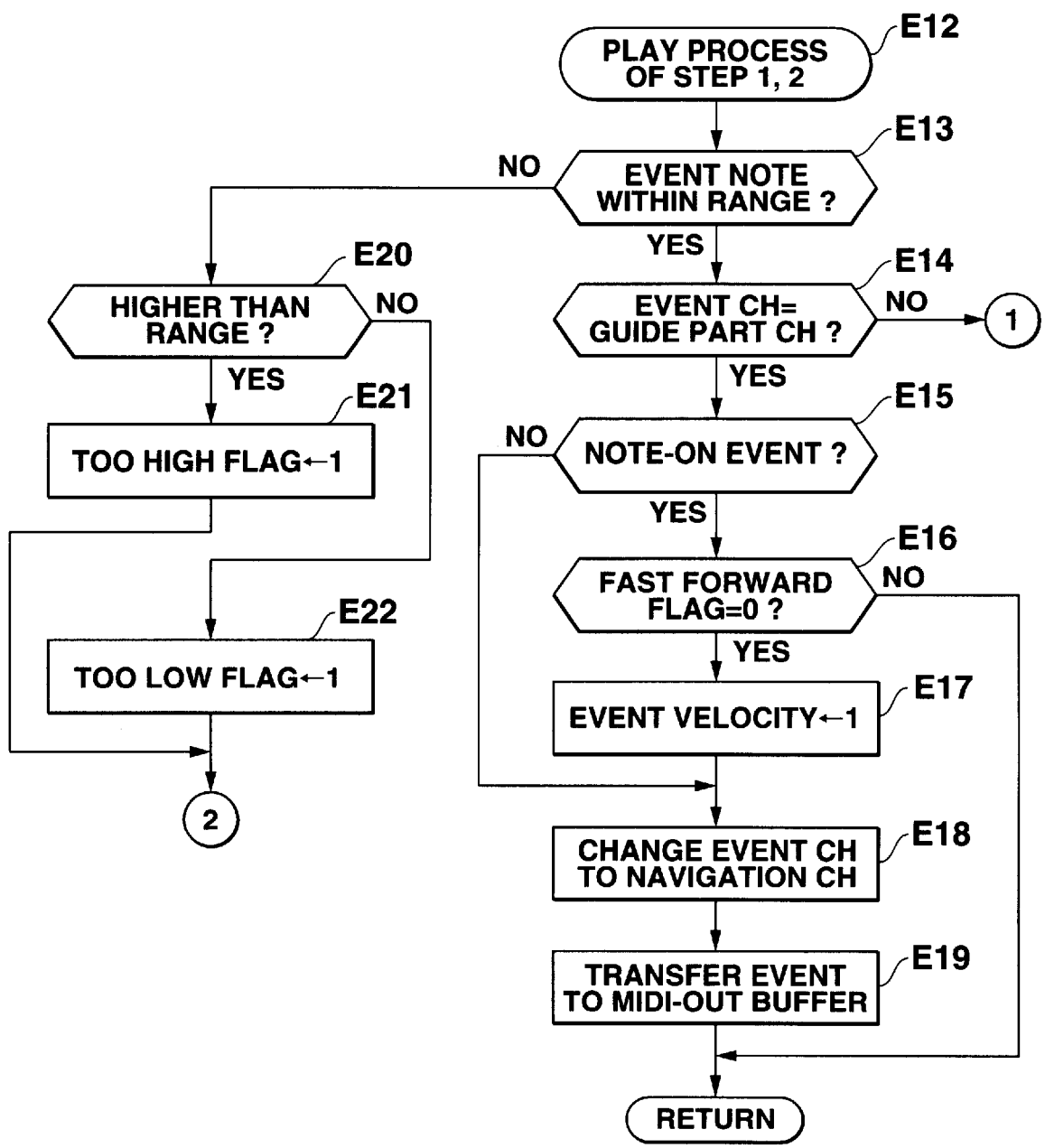
FIGS. 36–38 are flow charts of a play process of step 1, 2 in FIG. 34.
Figure 37:
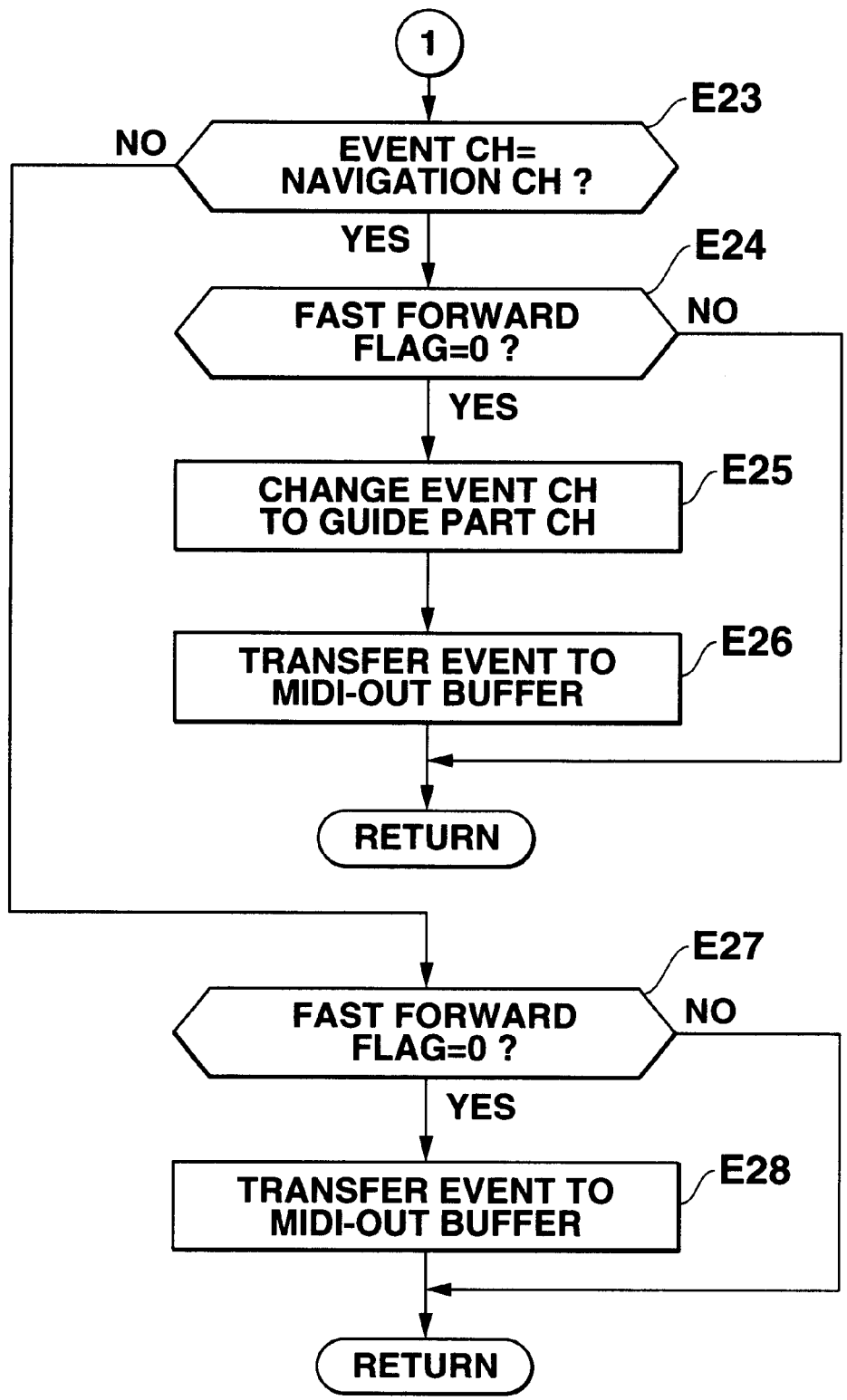
Figure 38:
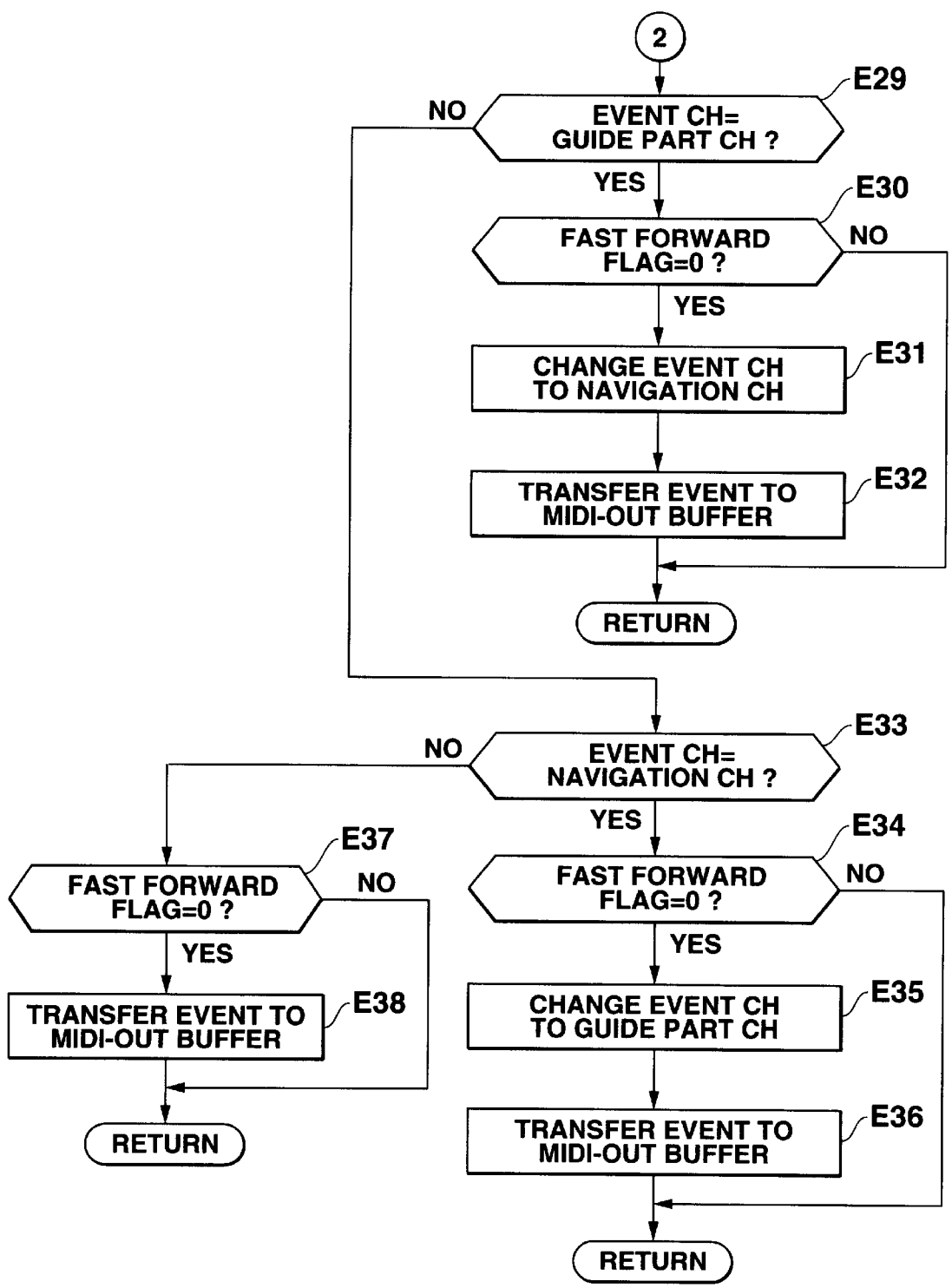

FIGS. 36–38 are flow charts of the play process of step 1, 2. Block E13 in FIG. 36 checks if the event note is within the keyboard range. In the affirmative, block E14 checks if the event channel is the guide part channel. If this is the case, block E15 checks if the event is a note on event. In the affirmative, block E16 checks if the fast forward flag is "0". In the affirmative, block E17 sets the event velocity to "1" (minimum). In the negative (fast forward flag=1), the play process of step 1 or 2 terminates.

After block E17, or if the event is not a note on event (E15), block E18 changes the event channel to the navigation channel. Block E19 transfers the event to the MIDI-out buffer. Then the play process of step 1, 2 terminates.

When the event note is out of the keyboard range RANGE (E13), block E20 checks if the event note is higher than the range. In the affirmative block E21 sets the too-high flag to "1". In the negative, block E22 sets too-low flag to "1".

When the event channel is not the guide part channel (E14), block E23 in FIG. 37 checks if the event channel is the navigation channel. In the affirmative, block E24 checks if the fast forward flag is "0". In the affirmative block E25 changes the event channel to the guide part channel. Block E26 transfers the event to the MIDI-out buffer. After block E26, or when the fast forward flag is "1" (E24), the play process of step 1, 2 terminates. If the event channel is not the navigation channel (E23), block E27 checks if the fast forward flag is "0". In the affirmative, block E28 transfers the event to the MIDI-out buffer. After the block E28, or if the fast forward flag is "1" (E27), the play process of step 1, 2 terminates.

After setting the too-high flag or too-low flag to "1" (E21, E22), the play process of step 1, 2 executes the block E29 in FIG. 38 to check if the event channel is the guide part channel. If this is the case, block E30 checks if the fast forward flag is "0"m. In the affirmative, block E31 changes the event channel to the navigation channel. Block E32 transfers the event to the MIDI-out buffer. After block E32, or when the fast flag is "1" (E30), the play process of step 1, 2 terminates.

If the event channel is not the guide part channel (E29), block E33 checks if the event channel is the navigation channel. In the affirmative, the block E34 checks if the fast forward flag is "1". In the affirmative, the block E35 changes the event channel to the guide part channel. Block E36 transfers the event to the MIDI-out buffer. After block E36, or when the fast forward flag is "1" (E34), the play process of step 1, 2 terminates. If the event channel is not the navigation channel (E33), block E37 checks if the fast forward flag is "0". In the affirmative block E38 transfers the event to the MIDI-out buffer. After block E38, or when the fast forward flag is "1" (E37), the play process of step 1, 2 terminates, and returns to the note on/off buffer data check block E1 in FIG. 34.

Figure 40:
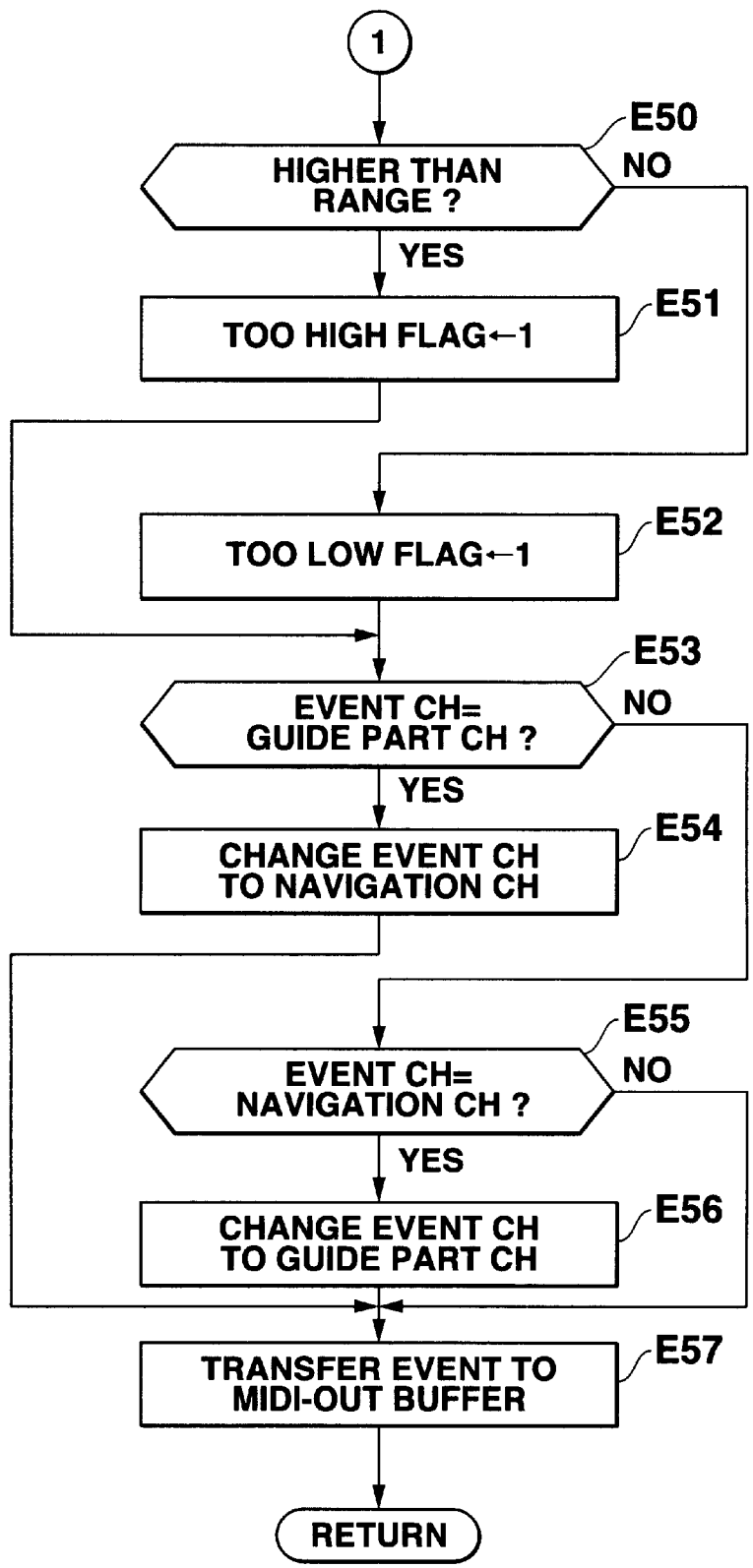

FIGS. 39 and 40 are flow charts of the play process of step 3. Block E39 in FIG. 39 checks if the event note is within the keyboard range RANGE. In the affirmative, block E40 checks if the event channel is the guide part channel. If this is the case, block E41 checks if the event is a note event (note-on or off event). In the affirmative, block E42 changes the event channel to the navigation channel. Then, block E43 checks if the event is a note on event. In the affirmative, block E44 minimizes the event velocity to "1". The block E44 is skipped when the event is a note-off event (E43). Then the block E45 transfers the event to the MIDI-out buffer.

If the event is not a note event (E41), block E46 changes the event channel to the navigation channel and the transfer block E45 is executed.

If the event channel is not the guide part channel (E40), block E45 checks if the event channel is the navigation channel. In the affirmative, block E48 changes the event channel to the guide part channel. Block E48 is skipped when the event channel is not the navigation channel (E47). Then block E49 transfers the event to the MIDI-out buffer.

After the transfer block E45 or E49, the play process of step 3 terminates and returns to the note on/off buffer data check block E1 in FIG. 34.

If the event note is out of the keyboard range RANGE (E39), the block E50 in FIG. 40 checks if the event note is higher than the keyboard range. If this is the case, block E51 sets the too-high flag to "1". If the event note is lower than RANGE (E50), block E52 sets the too-low flag to "1". After setting the too-high flag or too-low flag (E51, E52), the play process of step 3 executes the block E53 to check if the event channel is identical with the guide channel. In the affirmative, block E54 changes the event channel to the navigation channel. If the event channel is not the guide part channel (E53), block E55 checks if the event channel is the navigation channel. In the affirmative, block E56 changes the event channel to the guide part channel. After the block E54 or E56, or if the event channel is neither guide part channel nor navigation channel (E53, E55), the play process of step 3 executes the block E57 to transfer the event to the MIDI-out buffer. After block E57, the play process of step 3 terminates and returns to the note on/off buffer data check block E1 in FIG. 34.

Figure 41:
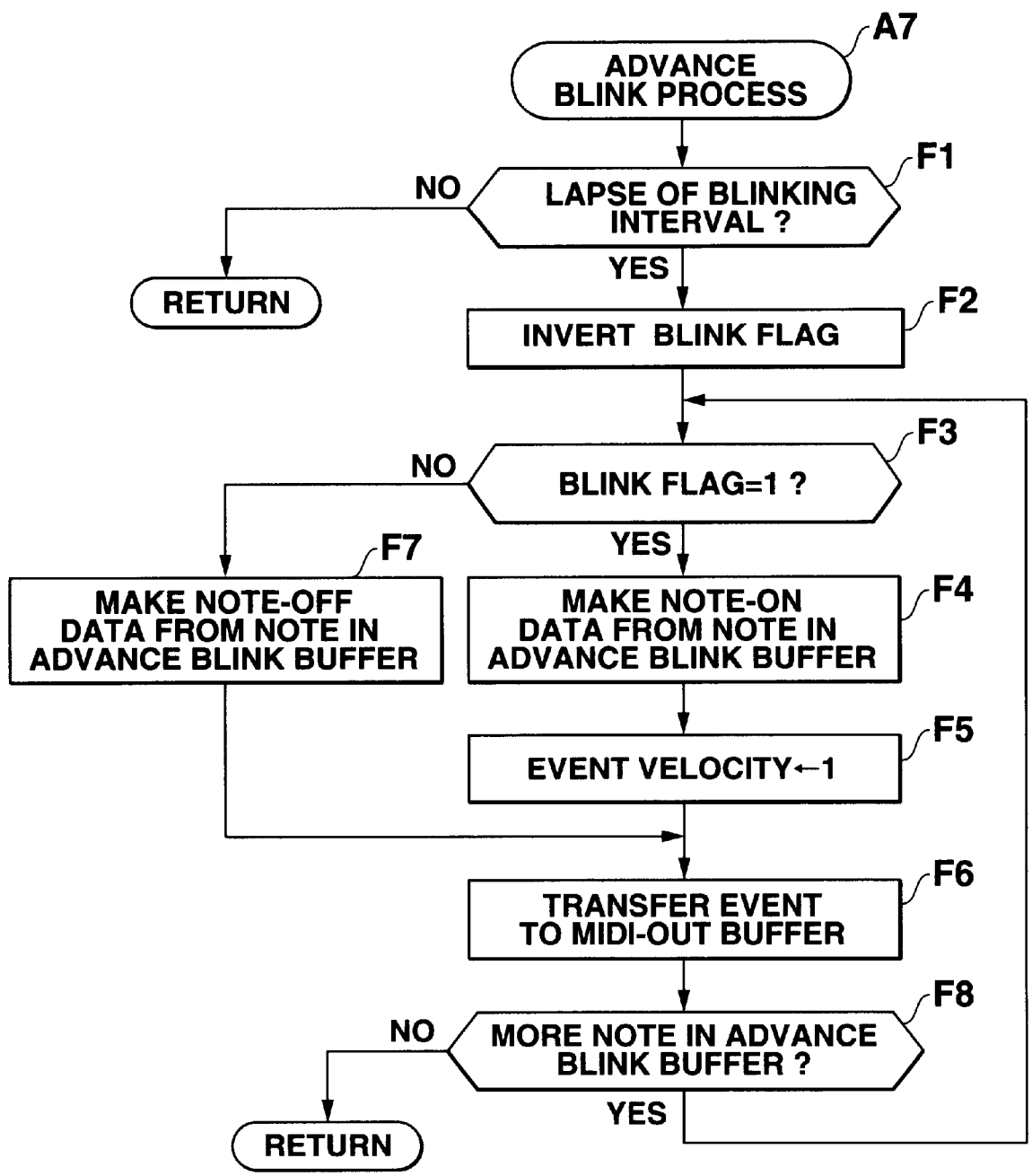
FIG. 41 is a flow charts of an advance blink process in FIG. 7.

FIG. 41 is a flow chart of the advance blink process A7 in the main routine in FIG. 7. The advance blink process A7 controls light emitting elements of to-be-played keys of the keyboard instrument to blink by alternately making turn-on-light data (in the form of note-on data) and turn-off-light data (note-off data) from the contents of the advance blink buffer at blinking intervals and sending them to the keyboard instrument 20. Specifically, block F1 checks if the blinking interval has elapsed. In the negative, the advance blink process A7 terminates. In the affirmative, block F2 inverts blink flag. Then, block F3 checks if the blink flag is "1" indicative of "turn on light". In the affirmative, block F4 makes note-on data from a note in the advance blink buffer. Block F7 minimizes event velocity to "1". When the blink flag is "0" indicative of "turn off light" (F3), block F7 makes note-off data from a note in the advance blink buffer.

After block F5 or F7, block F6 transfers the event (note-on data or note-off data) to the MIDI-out buffer to send them to the keyboard instrument 20 as turn-on-light or turn-off-light data. Then block F8 checks if there remains more note data in the advance blink buffer. In the affirmative, the advance blink process 6 returns to the blink value check block F3 to repeat the loop of F3–F8. If no more data is found in the advance blink buffer (F8), the advance blink process A7 terminates and returns to the main routine of FIG. 7.

Figure 42:
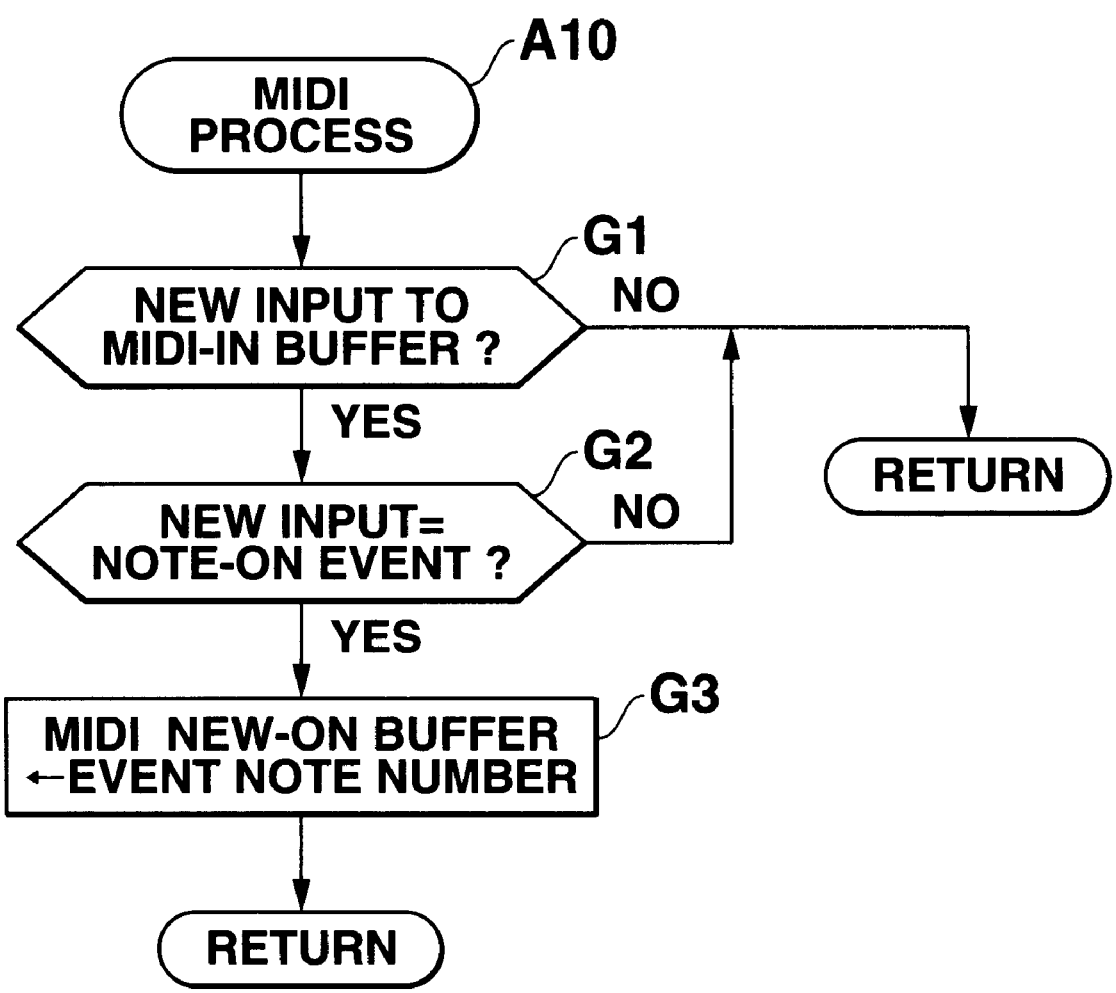
FIG. 42 is a flow chart of a MIDI process in FIG. 7.

FIG. 42 is a flow chart of the MIDI process A8 in FIG. 7. When a new input is received by the MIDI-in buffer (G1), the block G2 checks if the new input is a note-on event. In the affirmative, block 13 loads the event note into the MIDI new-on buffer. In this manner, key-on operation by the player (user) on the keyboard instrument is recorded in the MIDI new-on buffer.

In accordance with the embodiment, an external storage (FD15) stores music data representative of a music piece including a plurality of musical parts. For a musical part of automatic performance, the apparatus 10 sequentially reads note data thereof at their respective play timings note-on timings and sequentially send them to the keyboard instrument. On the other hand, for a musical part to be played by the user for performance training, the apparatus 10 sequentially reads in advance note data thereof before their respective play timings and send them to the keyboard instrument 20 for advance notice of keys to be played next by blinking the corresponding key light emitting elements. Therefore, the musical performance training apparatus 10 allows a user to play the musical part of performance training according to the guide of advance blinking light emitting elements of keys. Further, the apparatus 10 does not require a buffer storage for storing music data covering a complete music piece.

In accordance with the embodiment, the apparatus can select a desired music part for performance training and assign the selected part to the MIDI-out channel corresponding to a musical instruments MIDI-in channel dedicated to the navigation for performance training. Thus, the input channel of navigation in the keyboard instrument 20 connected to the apparatus 10 receives data thereto and controls key light emitting elements of navigation according to the received data. For musical parts for automatic performance, the apparatus 10 assigns music data for automatic performance to a communication (MIDI) channel for automatic performance so that the keyboard instrument 20 plays automatic performance of the parts using the tone generator 27.

In accordance with the embodiment, the apparatus 10 detects a time difference between first note data and subsequent note data of a musical part for performance training and determines therefrom whether the first note and subsequent note constitute chord notes to be played simultaneously. If this is the case, the apparatus 10 sends the first and subsequent note data to the keyboard instrument at the same time. As the result, key light emitting elements for the chord are simultaneously operated or blinked. Therefore, even if the stored music data includes chord notes having a time difference from one another, a user of the keyboard instrument 20 is guided to play the chord notes at the same time.

Whereas, in the embodiment, a keyboard instrument 20 is connected to the present musical performance training apparatus 10, a musical instrument other than keyboard instrument, for instance, electronic stringed instrument may be connected. Light emitting elements are provided on frets arranged along strings. For chord navigation, a combination of light emitting elements on frets constituting a chord are controlled at the same time so that a user can easily practice a chord performance on the stringed instrument.

Whereas, in the embodiment, the musical performance training apparatus 10 is realized by a dedicated apparatus for performance training. The musical performance training apparatus can be realized by a general purpose computer such as personnel computer. Such a computer with a musical performance training program of the invention installed therein may be connected to a musical instrument.

What is claimed is:

1. An apparatus for musical performance training, comprising:
    reading means for sequentially reading a succession of note data;
    transmitting means for transmitting performance training data to a musical instrument connected to the apparatus based on the read note data;
    detecting means for detecting a time difference between a note-on time of first note data read by said reading means and a note-on time of subsequent note data read by said reading means; and
    controlling means for determining chord notes to be played simultaneously from the first and subsequent note data when the detected time difference is smaller than a predetermined value and for controlling said transmitting means to simultaneously transmit a plurality of the performance training data based on the first and subsequent note data in response to said determining.

2. The apparatus of claim 1 wherein said reading means sequentially reads the succession of note data from a music data storage.

3. The apparatus of claim 1 wherein the musical instrument includes a plurality of operation elements and a plurality of light emitting elements corresponding thereto and wherein said performance training data are used to control said light emitting elements.

4. The apparatus of claim 1 wherein said controlling means comprises checking means for checking whether the number of said performance training data to be transmitted simultaneously is greater than a polyphonic number of said musical instrument and means for controlling said transmitting means to transmit the plurality of said performance training data at one time when said number is found not greater than said polyphonic number and for controlling said transmitting means to transmit the plurality of said performance training data on a division basis at a plurality of times when said number is found greater than said polyphonic number.

5. An apparatus for musical performance training, comprising:
    reading means for sequentially reading a succession of note data each of which includes a note-on timing, said note data comprising a plurality of musical parts;
    selecting means for selecting at least one of the plurality of musical parts of the note data as a musical part for performance training, and for selecting at least another one of the plurality of musical parts of the note data as a musical part for automatic performance;
    transmitting means for transmitting said musical part for performance training to a musical instrument connected to the apparatus and for also transmitting said musical part for automatic performance to the musical instrument; and
    controlling means for controlling said reading means to read, in advance, respective note data of the musical part for performance training before the respective note-on timings thereof, and for controlling said reading means to read respective note data of the musical part for automatic performance at the respective note-on timings thereof.

6. The apparatus of claim 5, wherein said musical instrument includes a plurality of operation elements and a plurality of light emitting elements corresponding thereto, and wherein the succession of note data of the musical part for performance training is used to control the light emitting elements.

7. An apparatus for musical performance training, comprising:
    reading means for sequentially reading music data including a plurality of musical parts;
    transmitting means having a plurality of output channels for transmitting the read music data to a musical instrument having a plurality of input channels corresponding to the plurality of the output channels in such a manner that each output channel carries a different one of the plurality of musical parts of the music data;
    first selecting means for selecting at least one of the plurality of musical parts of the music data as a musical part for performance training, and for selecting at least another one of the plurality of musical parts of the music data as a musical part for automatic performance;
    second selecting means for selecting one of the plurality of input channels for performance training; and
    assigning means for assigning the selected musical part for performance training to a respective one of the output channels corresponding to the selected one of the input channels, and for assigning the selected musical part for automatic performance to another one of the output channels for automatic performance.

8. The apparatus of claim 7, wherein said musical instrument comprises a plurality of operation elements and a plurality of light emitting elements corresponding thereto, and wherein the transmitted note data control the light emitting elements.

9. A recording medium having stored thereon a computer readable program for causing a computer to perform a process which comprises the steps of:
    sequentially reading a succession of note data;
    transmitting performance training data to a musical instrument connected to the computer based on the read note data;
    detecting a time difference between a note-on timing of first note data read during said sequential reading and note-on time of subsequent note data read during said sequential reading; and
    determining chord notes to be played simultaneously from the first and subsequent note data when the detected time difference is smaller than a predetermined value, and controlling transmission of said performance training data based on the first and subsequent note data in response to said determining.

10. A recording medium having stored thereon a computer readable program for causing a computer to perform a process which comprises the steps of:
    sequentially reading a succession of note data each of which includes a note-on timing, said note data comprising a plurality of musical parts;
    selecting at least one of the plurality of musical parts of the note data as a musical part for performance training, and selecting at least another one of the plurality of musical parts of the note data as a musical part for automatic performance;
    transmitting said musical part for performance training to a musical instrument connected to the computer and also transmitting said musical part for automatic performance to the musical instrument; and
    controlling respective note data of the musical part for performance training to be read, in advance, before the respective note-on timings thereof, and controlling respective note data of the musical part for automatic performance to be read at the respective note-on timings thereof.

11. A recording medium having stored thereon a computer readable program for causing a computer to perform a process which comprises the steps of:

sequentially reading music data including a plurality of musical parts;

transmitting the read music data to a musical instrument having a plurality of input channels corresponding to a plurality of output channels of said computer in such a manner that each output channel carries a different one of the plurality of musical parts of the music data;

selecting at least one of the plurality of musical parts of the music data as a musical part for performance training, and selecting at least another one of the plurality of musical parts of the music data as a musical part for automatic performance;

selecting one of the plurality of input channels for performance training; and assigning the selected musical part for performance training to a respective one of the output channels corresponding to the selected one of the input channels, and assigning the selected musical part for automatic performance to another one of the output channels for automatic performance.

* * * * *

UNITED STATES PATENT AND TRADEMARK OFFICE
CERTIFICATE OF CORRECTION

PATENT NO. : 6,342,663 B1
DATED : January 29, 2002
INVENTOR(S) : Hitoshi Kato

It is certified that error appears in the above-identified patent and that said Letters Patent is hereby corrected as shown below:

<u>Title page,</u>
Item [56], References Cited, U.S. PATENT DOCUMENTS, add
-- 5,266,735    11/1993    Shaffer et al    84/464A (X) --.

Signed and Sealed this

Ninth Day of September, 2003

JAMES E. ROGAN
*Director of the United States Patent and Trademark Office*